(12) United States Patent
Murata

(10) Patent No.: US 7,634,484 B2
(45) Date of Patent: Dec. 15, 2009

(54) METADATA DISTRIBUTION MANAGEMENT SYSTEM, APPARATUS, AND METHOD, AND COMPUTER PROGRAM THEREFORE

(75) Inventor: Noriyuki Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 918 days.

(21) Appl. No.: 10/926,034

(22) Filed: Aug. 26, 2004

(65) Prior Publication Data

US 2005/0080788 A1  Apr. 14, 2005

(30) Foreign Application Priority Data

Aug. 27, 2003  (JP) .............................. 2003-302692

(51) Int. Cl.
*G06F 17/00* (2006.01)
(52) U.S. Cl. ...................... 707/101; 707/102
(58) Field of Classification Search ............... 707/1–10, 707/100–104.1
See application file for complete search history.

(56) References Cited

U.S. PATENT DOCUMENTS

| | | | | |
|---|---|---|---|---|
| 5,768,578 | A * | 6/1998 | Kirk et al. ................... | 707/100 |
| 6,850,252 | B1 * | 2/2005 | Hoffberg .................... | 715/716 |
| 7,249,117 | B2 * | 7/2007 | Estes .......................... | 706/52 |
| 2002/0133491 | A1 * | 9/2002 | Sim et al. .................... | 707/10 |
| 2004/0039754 | A1 * | 2/2004 | Harple, Jr. ................ | 707/104.1 |

FOREIGN PATENT DOCUMENTS

| | | |
|---|---|---|
| JP | 2002-351878 | 12/2002 |
| JP | 2002-354386 | 12/2002 |
| JP | 2003-209523 | 7/2003 |
| JP | 2004-326459 | 11/2004 |

OTHER PUBLICATIONS

Masatoshi Kawarasaki, et al., "CDN control system by the metadata", Technical Report of the IEICE, vol. 103, 122, Jun. 13, 2003, pp. 37-40 (with English Abstract).

Tatsuya Kurioka, et al., "Left thing of DAVIC, 5. Standard and present conditions of TV Anytime", Institute of Image Information and Television Engineers magazine, vol. 53, No. 12, Dec. 20, 1999, pp. 1666-1673.

* cited by examiner

*Primary Examiner*—Mohammad Ali
*Assistant Examiner*—Navneet K Ahluwalia
(74) *Attorney, Agent, or Firm*—Oblon, Spivak, McClelland, Maier & Neustadt, L.L.P.

(57) ABSTRACT

A plurality of metadata relating to digital contents is presented to a user as a package. A media capsule provision server which comprises a media capsule structure information database for storing metadata relating to the digital contents, contents list structure information, a Raw data database, media capsule providing means for packaging the plurality of metadata stored in the database, media capsule distribution processing means for distributing the media capsule to a user, and a media capsule destination information database for managing the destination information is provided.

17 Claims, 25 Drawing Sheets

FIG. 7A

MEDIA CAPSULE SAMPLE
------------------------------------------------------------

```
<?xml version="1.0" encoding="UTF-8"?>
<mediaCapsule xmlns="urn:schemas-fusion:mc-format-1-0"
     mcId="fusion:mc.2158483649@fusion.sony.com"
     type="normal">

<mcStructure
          issure="fusion:user.123456@fusion.sony.com"
          issueDate="2002-01-01T00:00:00"
          modificationDate="2002-01-01T00:00:00"
          validFrom="2002-01-01T00:00:00"
          validUntil="2002-01-01T00:00:00"
          notifyFrom"2002-01-01T00:00:00"
          notifyUntil="2002-01-01T00:00:00"
          send="true"
          export="true"
          plural="true"
          abandon="true"
          nonposesses="false"
          trace="true"
          transfer="false"
          stick="false">
          <mcClass>
              mc.contents
          </mcClass>
          <mcService>
              TBD
          </mcService>
          <mcTitle>MC title</mcTitle>
          <presentationPayload payload="2"/>
          <primaryPayload payload="1"/>
          <language>ja-JP</language>
          <mcMetadata>
          </mcMetadata>
```

FIG. 7B

```
<uiMap>
    <mcAction event="menu" payload="3"/>
    <mcAction event="execute" payload="4"/>
    <mcAction event="select" payload="5"/>
    <mcAction event="drop" payload="6"/>
</uiMap>
</mcStructure>

<payload id="1">
    <payloadClass>
        object.item.videoItem.movie
    </payloadClass>
    <majorContentType>video</majorContentType>
    <payloadMetadata>
        <payloadAttribute upnp="dc:title" key="title"
            searchable="true" type="string">
            movie-title
        </payloadAttribute>
        <payloadAttribute upnp="upnp:genre" key="genre"
            searchable="true" type="string">
            gen re
        </payloadAttribute>
    </payloadMetadata>
    <resource>
        <resPropertyList>
            <resProperty name="contentType" type="string"
                value="video/mpeg"/>
            <resProperty name="resolution" type="resolution"
                value="720x480"/>
        </resPropertyList>
        <rawData access="embedded/indirect" encoding="text/plain">
            http://foo.com/getcontent.cgi
            <attachment id="1"/>
        </rawData>
    </resource>
</payload>
```

FIG. 7C

```
<payload id="2">
    <payloadClass>
        object.item.imageItem.thumbnail
    </payloadClass>
    <majorContentType>image</majorContentType>
    <resource>
        <resPropertyList>
            <resProperty name="contentType" type="string"
                value="image/jpeg"/>
            <resProperty name="resolution" type="resolution"
                value="80x80"/>
        </resPropertyList>
        <rawData access="net/direct" encoding="text/plain">
            fusion:rd.0000001@f1.sony.com
        </rawData>
    </resource>
    <resource>
        <resPropertyList>
            <resProperty name="contentType" type="string"
                value="image/png"/>
            <resProperty name="resolution" type="resolution"
                value="80x80"/>
        </resPropertyList>
        <rawData access="net/direct" encoding="text/plain">
            fusion:rd.000000w@f1.sony.com
        </rawData>
    </resource>
</payload>
<payload id="3">
    <payloadClass>
        object.item.uiItem.menu
    </payloadClass>
    <majorContentType>menu</majorContentType>
    <resource>
        <resPropertyList>
            <resProperty name="contentType" type="string"
```

FIG. 7D

```
                    value="menu/simple"/>
            </resPropertyList>
            <rawData access="net/direct" encoding="text/plain">
                <simpleMenu>
                    <simpleMenuEntry id="1" name="REPRODUCTION"
                        icon="movie" payload="1"/>
                </simpleMenu>
            </rawData>
        </resource>
    </payload>
</mediaCapsule>
```

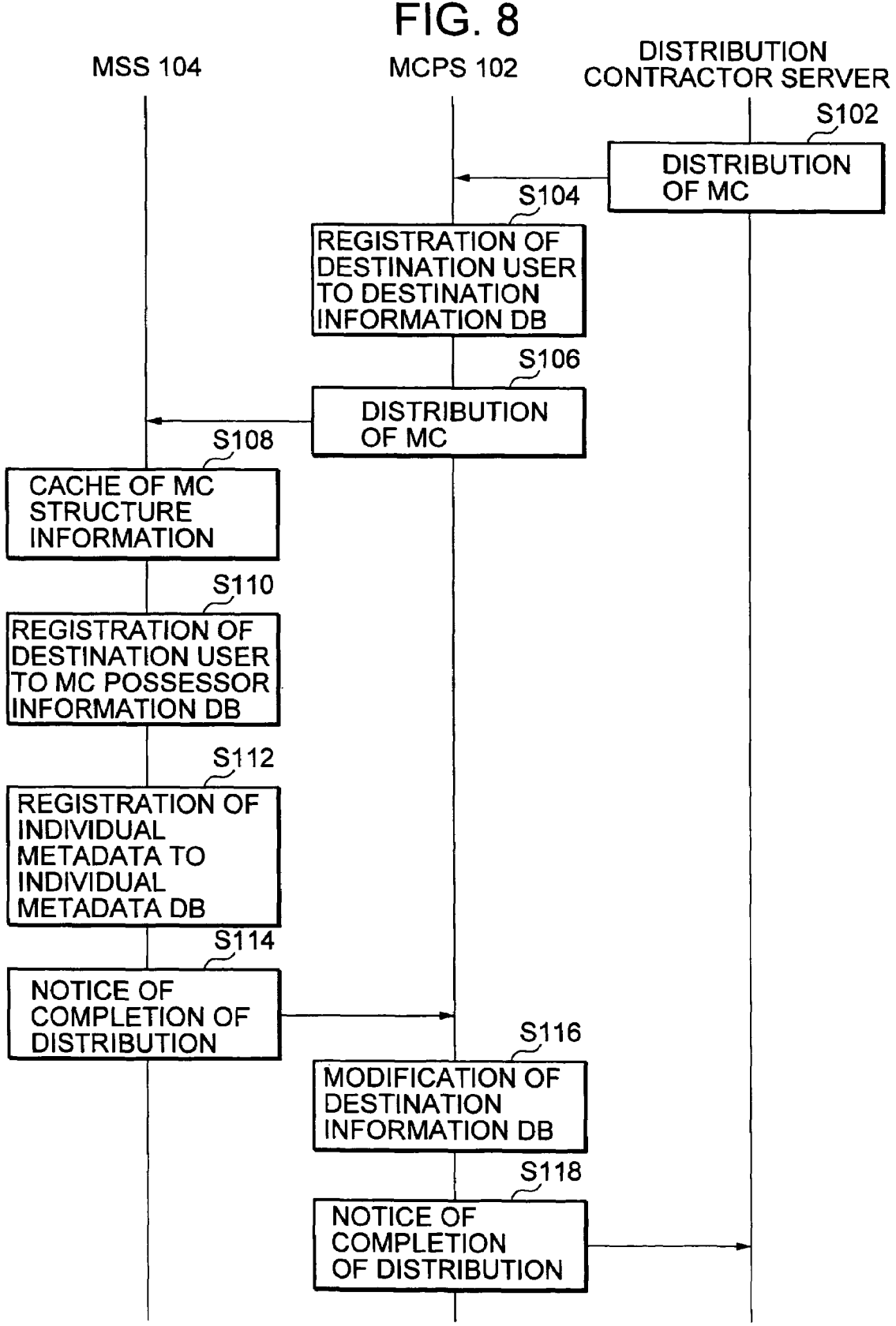

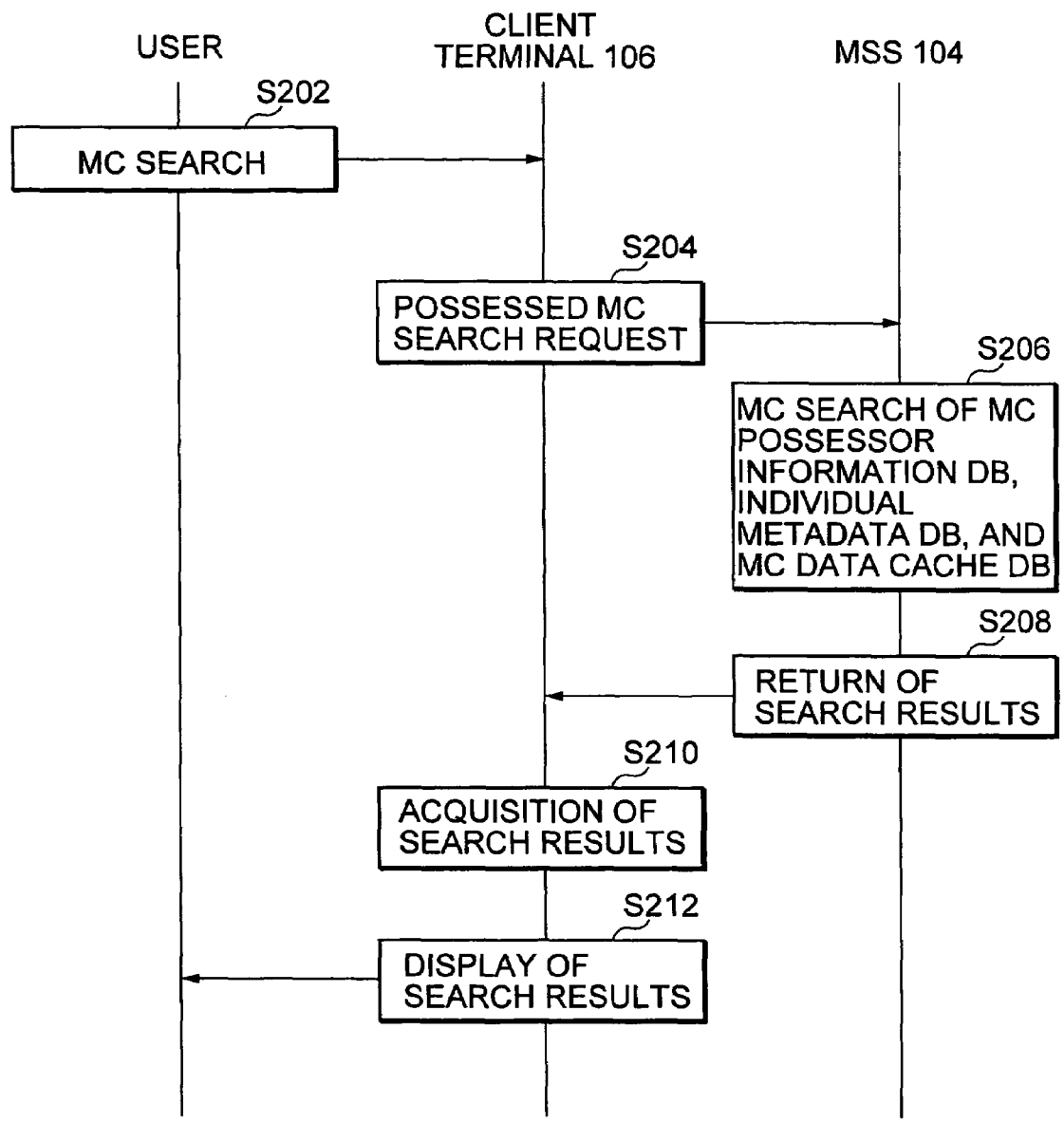

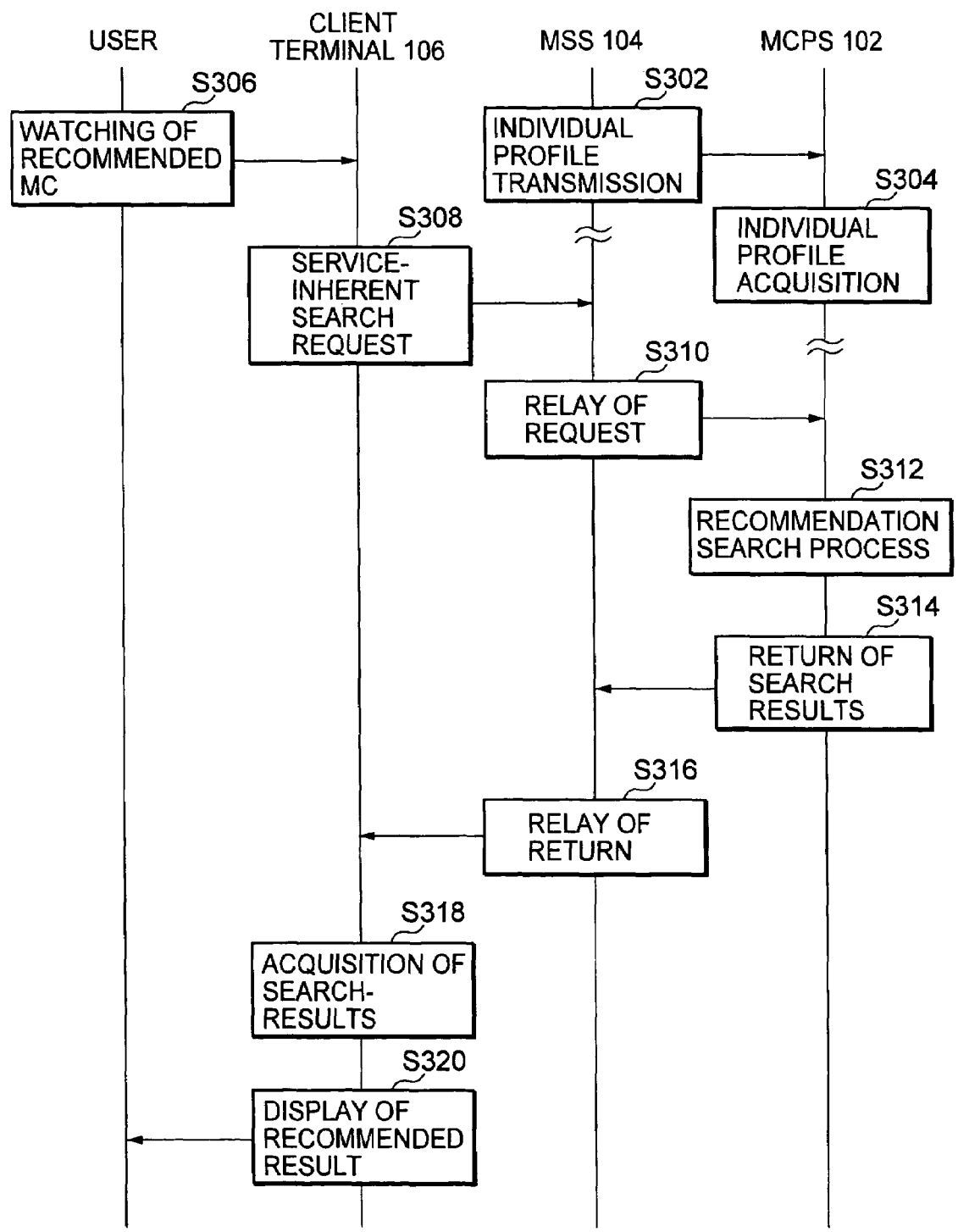

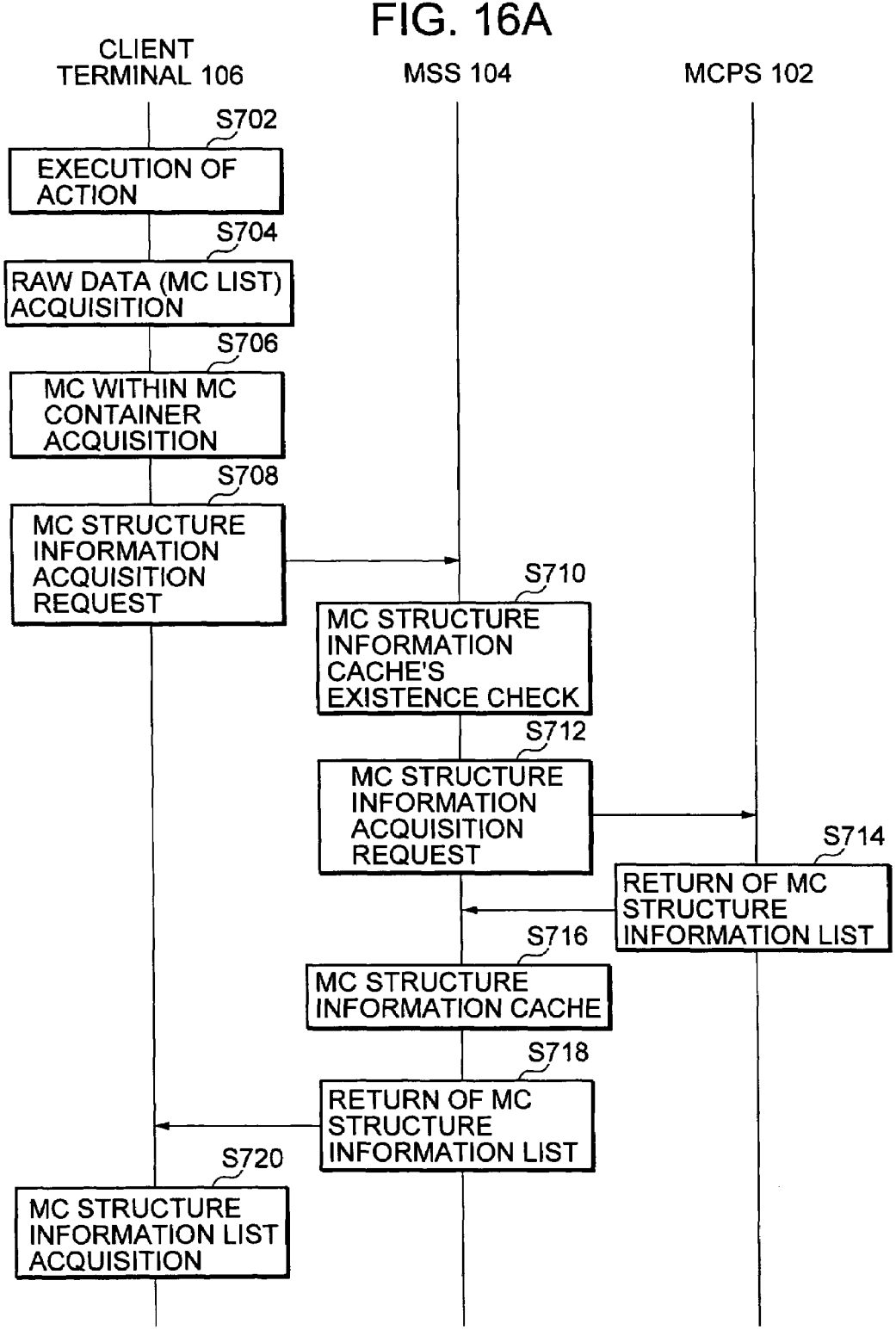

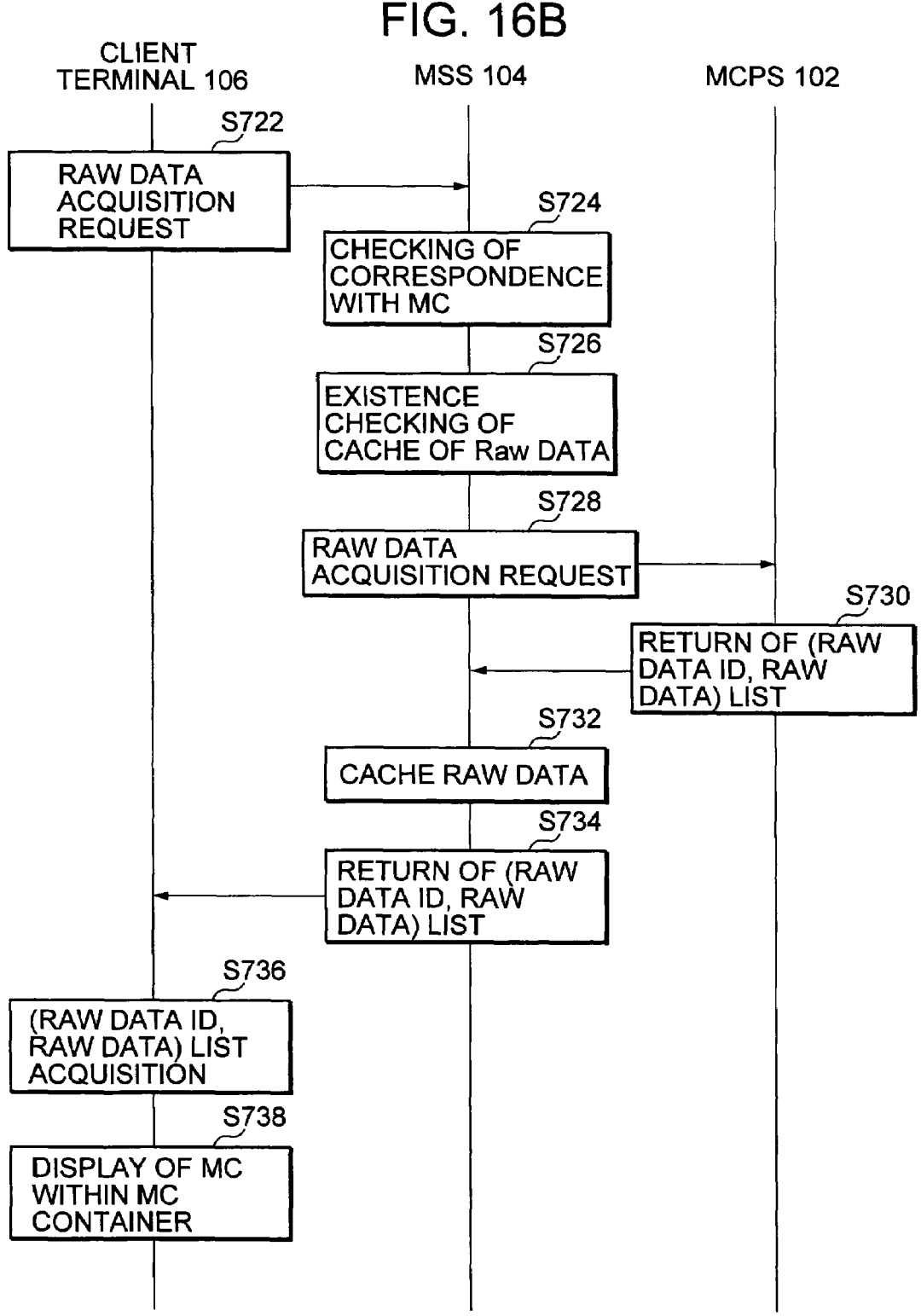

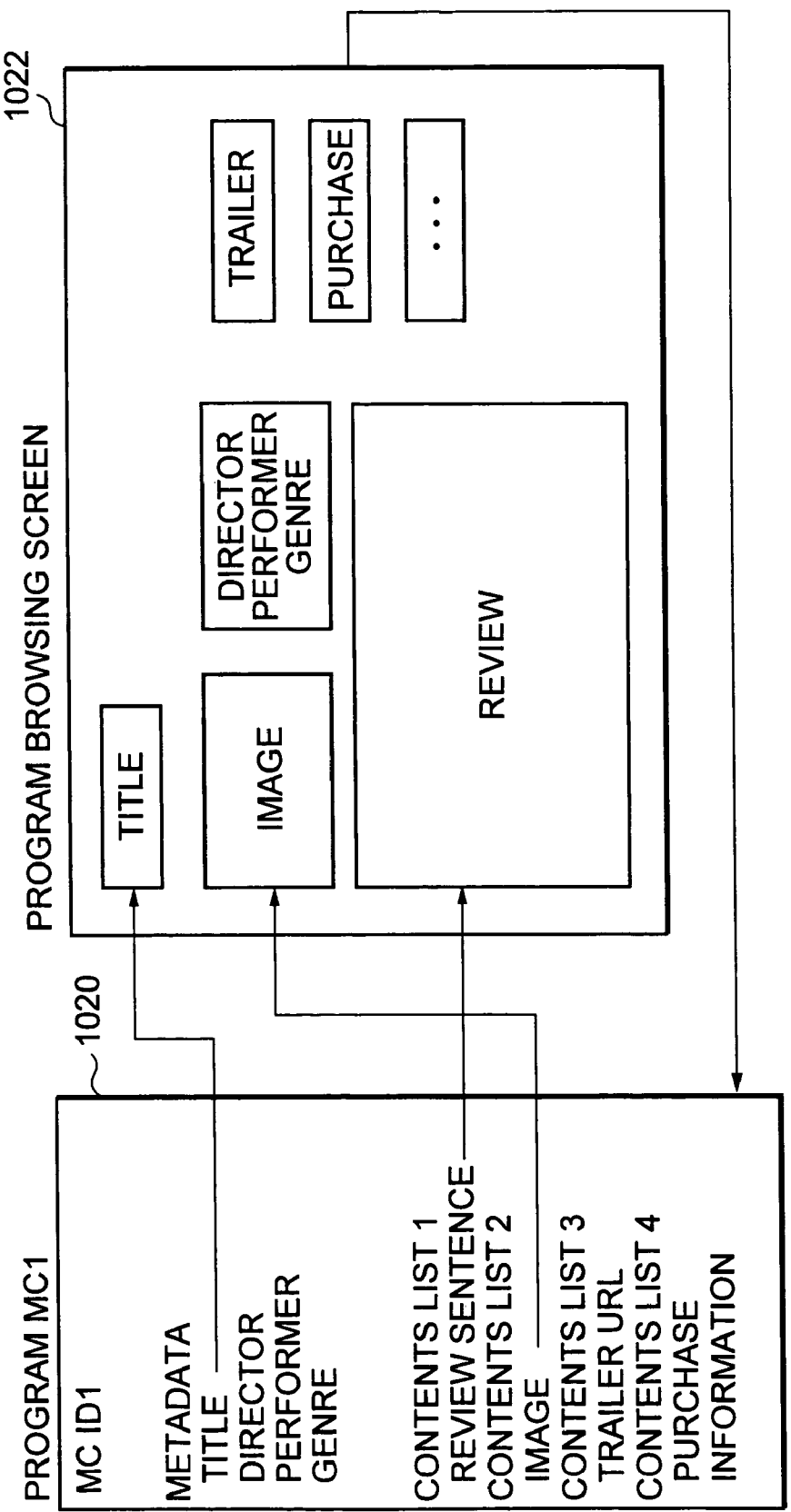

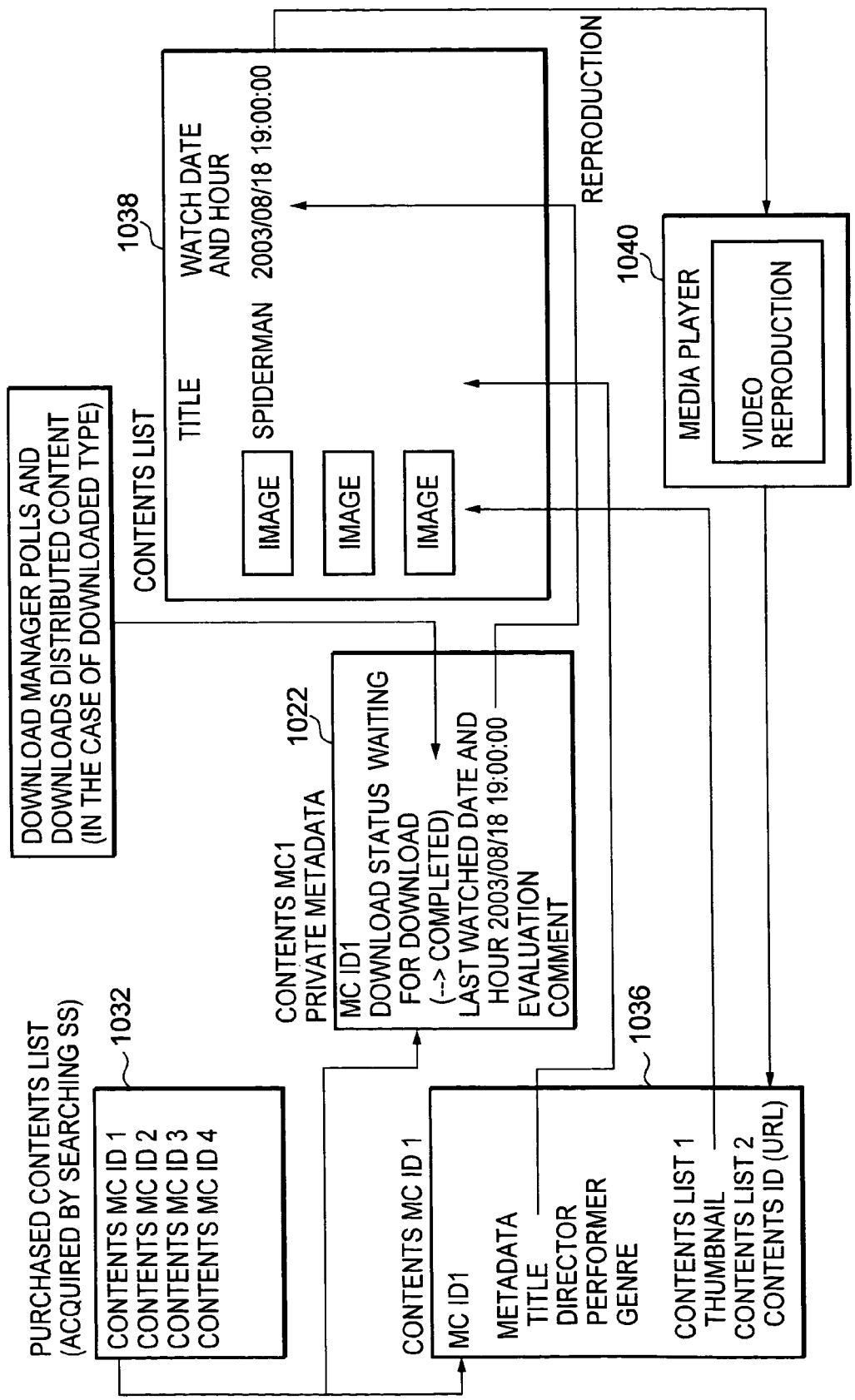

METADATA DISTRIBUTION MANAGEMENT SYSTEM, APPARATUS, AND METHOD, AND COMPUTER PROGRAM THEREFORE

CROSS REFERENCE TO RELATED APPLICATION

This application claims priority from Japanese Priority Document No. 2003-302692, filed on Aug. 27, 2003 with the Japanese Patent Office, which document is hereby incorporated by reference.

BACKGROUND OF THE INVENTION

1. Field of the Invention

The present invention relates to a metadata distribution management system, a metadata distribution management apparatus, an individual metadata management apparatus, a client terminal, a metadata distribution management method, and a computer program.

2. Description of the Related Art

Conventionally, a metadata is provided to digital contents, such as an image data, a music data, a video data, etc., which can be processed in information processing apparatuses, such as a computer, including display, reproduction, etc., so as to classify and manage the digital contents by utilizing the metadata.

For example, an object classification management method and system have been proposed in which the digital contents are classified and managed by utilizing the metadata which is an information data attached to the digital contents, and amount of feature of the digital contents (see Patent Document 1, for example). According to this system, the objects classified based on the amount of feature of the extracted feature, such as an image, music, colors in a web page, a shape, a pattern, which are extracted from the objects are managed together with the metadata given to the objects, so that the classification based on the features of the objects can be performed easily, and a large quantity of objects can efficiently be managed.

Patent Document 1: Japanese Laid-Open Patent No. 2002-259410

However, in the above-mentioned object classification management system, the metadata is used for classification management of the digital contents. The metadata is not used by a user who is going to acquire and use a digital content through a communications network.

Thus, an aspect of the present invention is to provide a metadata distribution management system, a metadata distribution management apparatus, an individual metadata management apparatus, a client terminal, a metadata distribution management method, and a computer program in which, in order for a user to use and acquire digital contents through a communications network, a plurality of metadata about the contents are packaged and provided to the user.

SUMMARY OF THE INVENTION

In order to solve the above-mentioned problems, according to a first aspect of the present invention, a metadata distribution management system is configured to include at least one metadata distribution management apparatus for managing a metadata relating to a digital content, and at least one client terminal connectable to the above-mentioned metadata distribution management apparatus through a communications network, in which the above-mentioned metadata distribution management apparatus comprises: metadata memory means for storing two or more metadata relating to the above-mentioned digital contents which includes at least a location information data on the above-mentioned digital contents, and a type information data on the above-mentioned digital contents; metadata package creation means for creating a metadata package by combining at least two or more of the above-mentioned metadata stored in the above-mentioned metadata memory means; metadata package distribution means for distributing the above-mentioned metadata package to the above-mentioned client terminal through the above-mentioned communications network; and metadata package destination information storage means for storing destination information data linking an information data identifying a user who uses the above-mentioned client terminal to which the above-mentioned metadata package distributed, and an information data identifying the above-mentioned metadata package, in which the above-mentioned client terminal comprises: metadata package acquisition means for acquiring the above-mentioned metadata package from the above-mentioned metadata distribution management apparatus through the above-mentioned communications network; and metadata package operation processing means for acquiring the above-mentioned digital content with reference to the above-mentioned location information data included in the above-mentioned metadata package, and performing a process suitable for the type of the above-mentioned digital content with reference to the above-mentioned type information data.

According to the above-mentioned invention, two or more metadata including at least the location information data and the type information data on the digital contents stored in the metadata memory means which is a constituent element of the metadata distribution management apparatus are packaged by the metadata package creation means so as to create the metadata package, thus being distributed to the client terminal through the communications network by the metadata package distribution means. The client terminal acquires the metadata package from the metadata distribution management apparatus by means of the metadata package acquisition means which is a constituent element of the client terminal. The metadata package operation processing means can process, including referring to, displaying, reproducing, etc., the digital content based on the location information data and the type information data which are included in the above-mentioned metadata package. Further, the metadata package destination information storage means, which is a constituent element of the metadata distribution management apparatus, links and stores the distributed metadata package and a destination user, so that the metadata distribution management apparatus can manage each user's metadata package possession status. By way of the above processing, in order for the user to acquire and to use the digital content through a communications network, a plurality of metadata about the above-mentioned contents can be packaged and provided to the user. Apart from a digital content entity, a plurality of metadata relating to the above-mentioned digital contents are packaged and distributed, including at least an address information data on the digital content entity, so as not to be influenced by capacity of the content data entity tending to increase, and not to affect searchability. Furthermore, in order to package the plurality of metadata, the user can be provided with various attached information data about the digital content.

The above-mentioned metadata distribution management system may be constructed to further comprise an individual metadata management apparatus connectable to the above-mentioned client terminal and the above-mentioned metadata distribution management apparatus through the above-mentioned communications network. The individual metadata management apparatus comprises: metadata package acquisition means for acquiring the above-mentioned metadata package from the above-mentioned metadata distribution management apparatus through the above-mentioned communications network; metadata package memory means for storing the above-mentioned metadata package; and transmission means for transmitting one or more metadata included in the above-mentioned metadata package and/or the above-mentioned metadata package to the above-mentioned client terminal, in which an information data identifying the metadata package stored in the above-mentioned metadata package memory means and an information data identifying a user who uses the above-mentioned client terminal being transmitted the above-mentioned metadata package are linked and managed. According to this structure, the individual metadata management apparatus acquires the metadata package from the metadata distribution management apparatus through the communications network by means of the metadata package acquisition means, which is its constituent element, so as to be stored in the metadata package memory means, whereby the above-mentioned metadata package can be transmitted to the client terminal by the transmission means. Further, by managing and linking the user to who the metadata package is transmitted and the above-mentioned metadata package, the individual metadata management apparatus can manage each user's metadata package possession status.

The above-mentioned metadata distribution management apparatus may further comprise container generation means for generating a container including therein a plurality of the above-mentioned metadata packages, so that the above-mentioned metadata package distribution means may distribute the above-mentioned container to the above-mentioned client terminal through the above-mentioned communications network. This structure can provide the user with the container including therein the plurality of metadata packages, so that the user can be provided with a plurality of related information data at once. For example, the container may function like a magazine in which a plurality of related items are collected.

The above-mentioned metadata distribution management apparatus may be constructed to further comprise container generation means for generating a container including therein a plurality of the above-mentioned metadata packages. The container generation means is characterized by including a different metadata package for every user in the above-mentioned container, based on the above-mentioned destination information data stored in the above-mentioned metadata package destination information storage means. According to this structure, based on the above-mentioned destination information data stored in the metadata package destination information storage means, that is, each user's metadata package possession status, the container generation means of the metadata distribution management apparatus may include, in the container, the metadata package which is not distributed for each user, or delete the distributed metadata package from the container, so as to provide the user with the container of the metadata package customized for each user. By providing the user with the container including therein the plurality of metadata packages, the user can be provided with the plurality of related information data at once. For example, the container may function like a magazine in which a plurality of related items are collected.

In order to solve the above-mentioned problems, according to a second aspect of the present invention, a metadata distribution management apparatus for managing a metadata relating to a digital content is configured to comprise: metadata memory means for storing two or more metadata relating to the above-mentioned digital content including at least the location information data on the above-mentioned digital content and the type information data on the above-mentioned digital content; metadata package creation means for creating a metadata package by combining at least two or more of the above-mentioned metadata stored in the above-mentioned metadata memory means; metadata package distribution means for distributing the above-mentioned metadata package to a connectable client terminal through a communications network; and metadata package destination information storage means for storing destination information data linking an information data identifying a user who uses the above-mentioned client terminal to which the above-mentioned metadata package is distributed, and an information data identifying the above-mentioned metadata package.

The above-mentioned metadata distribution management apparatus further comprises container generation means for generating a container including therein a plurality of the above-mentioned metadata packages, so that the above-mentioned metadata package distribution means may distribute the above-mentioned container to the above-mentioned client terminal through the above-mentioned communications network. This structure can provide the user with the container including therein a plurality of the metadata packages. The user can be provided with the plurality of related information data at once. For example, the container may function like a magazine in which the plurality of related items are collected.

The above-mentioned metadata distribution management apparatus may further comprise container generation means for generating a container including therein a plurality of the metadata packages, so that the metadata package distribution means may distribute the above-mentioned container to the above-mentioned client terminal through the above-mentioned communications network. Furthermore, based on the above-mentioned destination information data stored in the above-mentioned metadata package destination information storage means, the above-mentioned container generation means may include different metadata package for each user in the above-mentioned container.

In order to solve the above-mentioned problem, according to a third aspect of the present invention, an individual metadata management apparatus for managing metadata relating to a digital content for each user who can access a digital content by using the above-mentioned metadata, is configured to comprise: metadata package acquisition means for acquiring the above-mentioned metadata package through a communications network from a connectable metadata distribution management apparatus through the above-mentioned communications network; metadata package memory means for storing the above-mentioned metadata package; and transmission means for transmitting one or more metadata included in the above-mentioned metadata package and/or the above-mentioned metadata package to a connectable client terminal through the above-mentioned communications network, in which an information data identifying the metadata package stored in the above-mentioned metadata package memory means and an information data identifying a user who uses the above-mentioned client terminal to which the above-mentioned metadata package is transmitted are linked and managed.

In order to solve the above-mentioned problem, according to a fourth aspect of the present invention, a client terminal connectable to a metadata distribution management apparatus and/or an individual metadata management apparatus through a communications network, is configured to comprise: metadata package acquisition means for acquiring a metadata package from the above-mentioned distribution management apparatus and/or the individual metadata management apparatus through the above-mentioned communications network; and metadata package operation processing means for acquiring the above-mentioned digital content with reference to a location information data of the digital content included in the above-mentioned metadata package, and performing a process suitable for the type of the above-mentioned digital content with reference to the above-mentioned type information data of the above-mentioned digital content.

In order to solve the above-mentioned problem, according to a fifth aspect of the present invention, a computer program is provided which causes a computer to function as the metadata distribution management apparatus, the individual metadata management apparatus, or the client terminal.

In order to solve the above-mentioned problem, according to a sixth aspect of the present invention, a metadata distribution management method implemented by using at least one metadata distribution management apparatus for managing metadata relating to a digital content, and at least one client terminal connectable to the above-mentioned metadata distribution management apparatus through a communications network, is configured to comprise: a step of storing two or more metadata relating to the above-mentioned digital content which the above-mentioned metadata distribution management apparatus includes at least a location information data on the above-mentioned digital content and a type information data on the above-mentioned digital content; a step of creating a metadata package by combining at least two or more of the stored above-mentioned metadata; a step of distributing the above-mentioned metadata package to the above-mentioned client terminal through the above-mentioned communications network; a step of storing a destination information data linking an information data identifying a user who uses the above-mentioned client terminal to which the above-mentioned metadata package is distributed and an information data identifying the above-mentioned metadata package; a step where the above-mentioned client terminal acquires the above-mentioned metadata package from the above-mentioned metadata distribution management apparatus through the above-mentioned communications network; and a step of performing a process suitable for the type of the above-mentioned digital content with reference to the above-mentioned type information data, acquiring the above-mentioned digital content with reference to the above-mentioned location information data included in the above-mentioned metadata package.

As described above, according to the present invention, in order for a user to acquire and use a digital content through a communications network, a plurality of metadata relating to the above-mentioned content can be packaged and provided to the user.

BRIEF DESCRIPTION OF THE DRAWINGS

FIG. 7A is a sample diagram of the media capsule in the preferred embodiment;

FIG. 7B is a sample diagram of the media capsule in the preferred embodiment;

FIG. 7C is a sample diagram of the media capsule in the preferred embodiment;

FIG. 7D is a sample diagram of the media capsule in the preferred embodiment;

FIG. 8 is a process flow chart having shown a media capsule distribution process in the preferred embodiment;

FIG. 9 is a process flow chart having shown a possessed media capsule search process in the preferred embodiment;

FIG. 10 is a process flow chart having shown a recommended search process in the preferred embodiment;

FIG. 16A is a process flow chart having shown a media capsule display process in the preferred embodiment;

FIG. 16B is a process flow chart showing the process continued from FIG. 16A;

FIG. 19 is a diagram showing an example of the media capsule container use in the preferred embodiment; and FIG. 20 is a diagram showing an example of the media capsule container use in the preferred embodiment.

DESCRIPTION OF THE PREFERRED EMBODIMENTS

Referring to the accompanying drawings, a preferred embodiment of a metadata distribution management system in accordance with the present invention will be described in detail hereafter. In addition, in this specification and the drawings, like elements having substantially the same function and structure are given like reference signs, and the same description will not be repeated.

Whole System Structure:

Firstly, based on FIG. 1 and FIG. 2, a whole structure of a metadata distribution management system 100 constructed as a preferred embodiment of a metadata distribution management system in accordance with the present invention, for example, will be described. In addition, FIG. 1 is a block diagram showing a structure of the metadata distribution management system 100 in accordance with the preferred embodiment.

Figure 1:
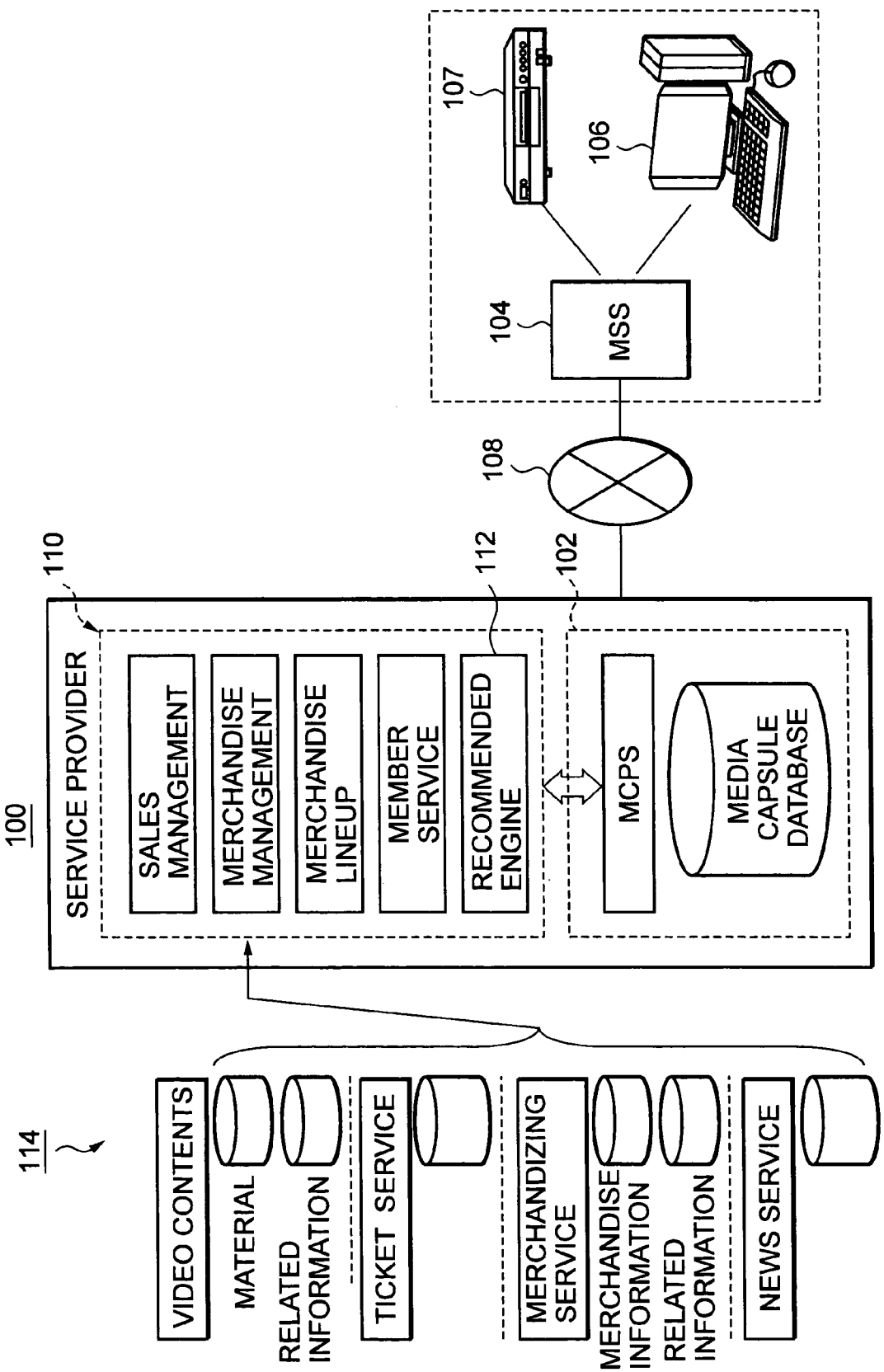
FIG. 1 is a block diagram showing a structure of a metadata distribution management system in accordance with a preferred embodiment of the present invention.

As shown in FIG. 1, the metadata distribution management system 100 is constituted by at least one media capsule provision server (Media Capsule Provide Server; referred to as MCPS in the drawings) 102, at least one my storage server (My Storage Server; referred to as MSS in the drawings) 104, at least one client terminal 106, a communications network 108, etc.

The media capsule provision server 102 is an information processing apparatus, such as a computer, constructed as an example of a metadata distribution management apparatus, mainly generates and manages a media capsule, and provides the media capsule to the my storage server 104/a client terminal.

The media capsule (may also be referred to as MC hereinafter and in the drawing) is constructed as an example of a metadata package, and packaged by combining a plurality of metadata which are information data attached to digital contents, such as for example, an image data, a music data and a video data, which can be communicated over the communications network 108. Examples of the metadata are information data providing access to the contents by referring to the metadata, such as a name of contents, an address of the contents, etc.; a text indicating the contents, etc.; information data used when retrieving a target content from a large number of contents; or legal information data, such as restrictions of contents, etc., for example. The metadata packaged as the media capsule and a detailed structure of the media capsule in the preferred embodiment will be described later.

In the preferred embodiment, one that possesses and manages the media capsule provision server 102 is a service provider who provides contents distribution services, such as, a movie, an image and music, etc. through the communications network 108 to the client terminal 106 possessed by a user. As shown in FIG. 1 and FIG. 2, the media capsule provision server 102 is connected to, for example, a service provision system 110 possessed by the service provider in order to perform sales management, merchandise management, etc., to thereby manage the metadata about the contents 114 provided by the service provider. A content entity may be held by the service provision system 110 or held by the media capsule provision server 102, or alternatively be stored in another information processing apparatus further connected through the communications network 108. The address information data on the content entity is also included in the metadata managed by the media capsule provision server 102. Referring to the metadata, it is possible to know where the content entity is stored. Further, although in the above description, the media capsule provision server 102 is constructed to be managed by the service provider and connected with the service provision system 110, the present invention is not limited to this example. As described above, the media capsule provision server 102 is managed by packaging metadata attached to the digital contents. If it is constituted so that such function may be achieved, it is not a matter of possessor or connection status.

The service provision system 110 is provided with a recommended engine 112. The recommended engine 112 can perform a search directing to the metadata managed by the media capsule provision server 102.

The my storage server 104 is an information processing apparatus, such as a computer, constructed as an example of the individual metadata management apparatus, and manages the media capsule used by users for each user who refers to a digital content, etc. by using the metadata distribution management system 100 in accordance with the preferred embodiment. One my storage server 104 may be provided between a plurality of media capsule provision servers 102 and a plurality of client terminals 106, so as to consolidate a plurality of user's information data and information data on the media capsule provided from a plurality of media capsule provision servers 102. Alternatively, a plurality of my storage servers 104 may be provided so that a plurality of media capsule provision servers 102 may have my storage servers 104 respectively, or a plurality of my storage servers 104 may be provided so that each of users may have the my storage server 104.

Figure 2:
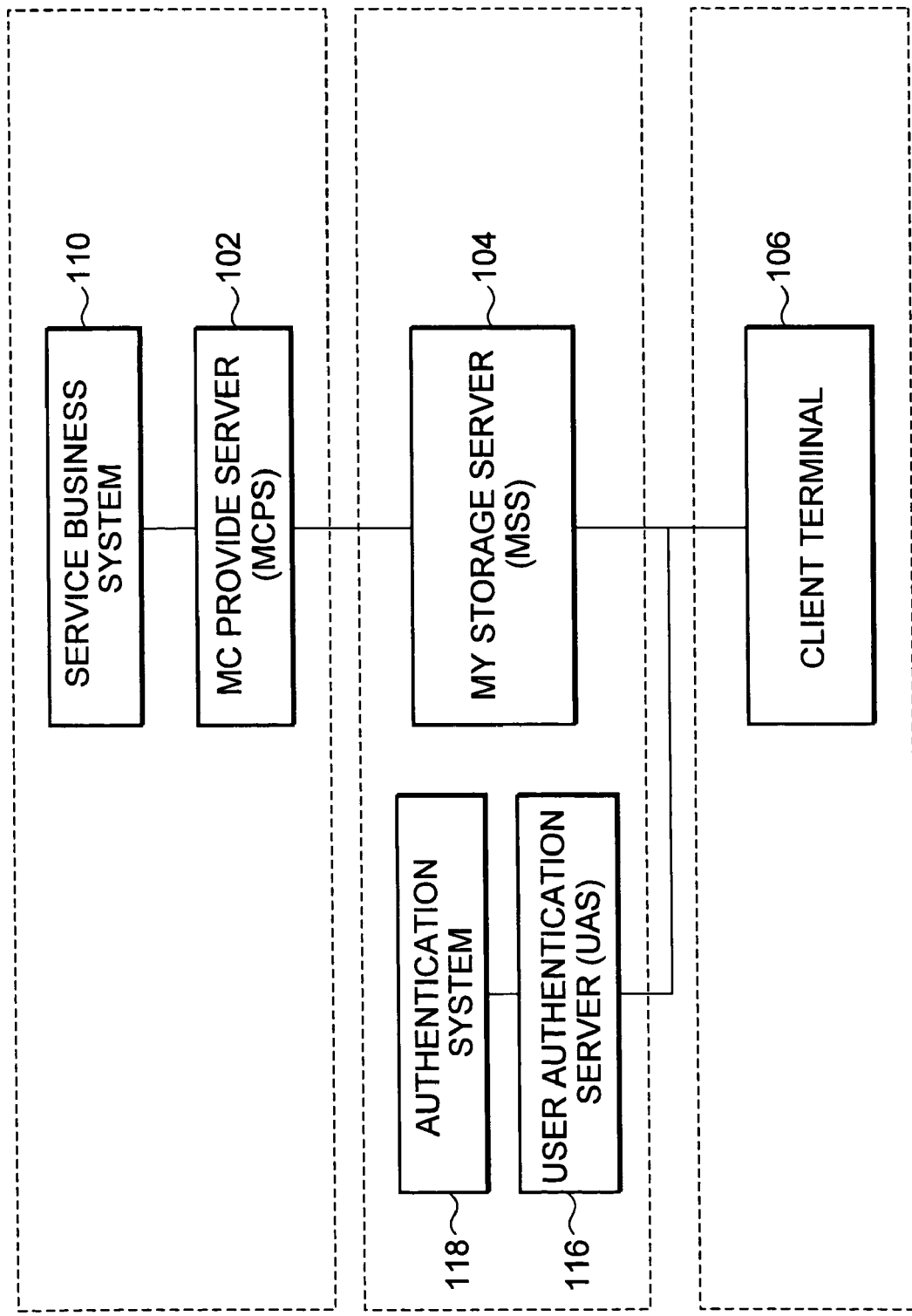
FIG. 2 is a block diagram showing a structure of the metadata distribution management system in the preferred embodiment.

As shown in FIG. 2, in this preferred embodiment, the my storage server 104 is connected with an authentication system 118 through a user authentication server (UAS) 116. In the authentication system 118, it is possible to authenticate that a user who tries to access from the client terminal 106 to the my storage server 104 is a user who can use the metadata distribution management system 100 in accordance with this preferred embodiment.

The client terminal 106 is a data terminal unit which has function of referring to, displaying, reproducing, etc. a digital content. Examples of the client terminal 106 are a personal computer, a mobile data terminal, such as a PDA (Personal Digital Assistant), a mobile phone, household appliances having data terminal function, such as a television set, a DVD player, etc., for example.

The communications network 108 may be a telephone line, a dedicated line, etc. which allow bi-directional communications, and have function of bi-directionally distributing the media capsule, etc. in this preferred embodiment. The communications network 108 includes the Internet and others regardless of whether they are wireless or wired.

The media capsule provision server 102 and the my storage server 104 can communicate with each other through the communications network 108, to thereby at least transmit and receive the media capsule having packaged metadata in accordance with the preferred embodiment. As shown in FIG. 1, the client terminal 106 may be connected with the my storage server 104 through a LAN (Local Area Network), etc., for example, so as to communicate only with the my storage server 104, or connected with the communications network 108 so as to communicate with the media capsule provision server 102 and the my storage server 104. Alternatively, the my storage server 104 may be removed from the system configuration, and the media capsule provision server 102 and the client terminal 106 are connected through the communications network 108, so that the media capsule may be transmitted and received between the media capsule provision server 102 and the client terminal 106, not via the my storage server 104. Further, since the number of the client terminals may only be one or more, the client terminal 107 may be connected to the my storage server 104 together with the client terminal 106.

The whole structure of the metadata distribution management system 100 is described in accordance with the preferred embodiment. Next, a structure of the media capsule provision server 102 in accordance with the preferred embodiment will be described based on FIG. 3.

Figure 3:
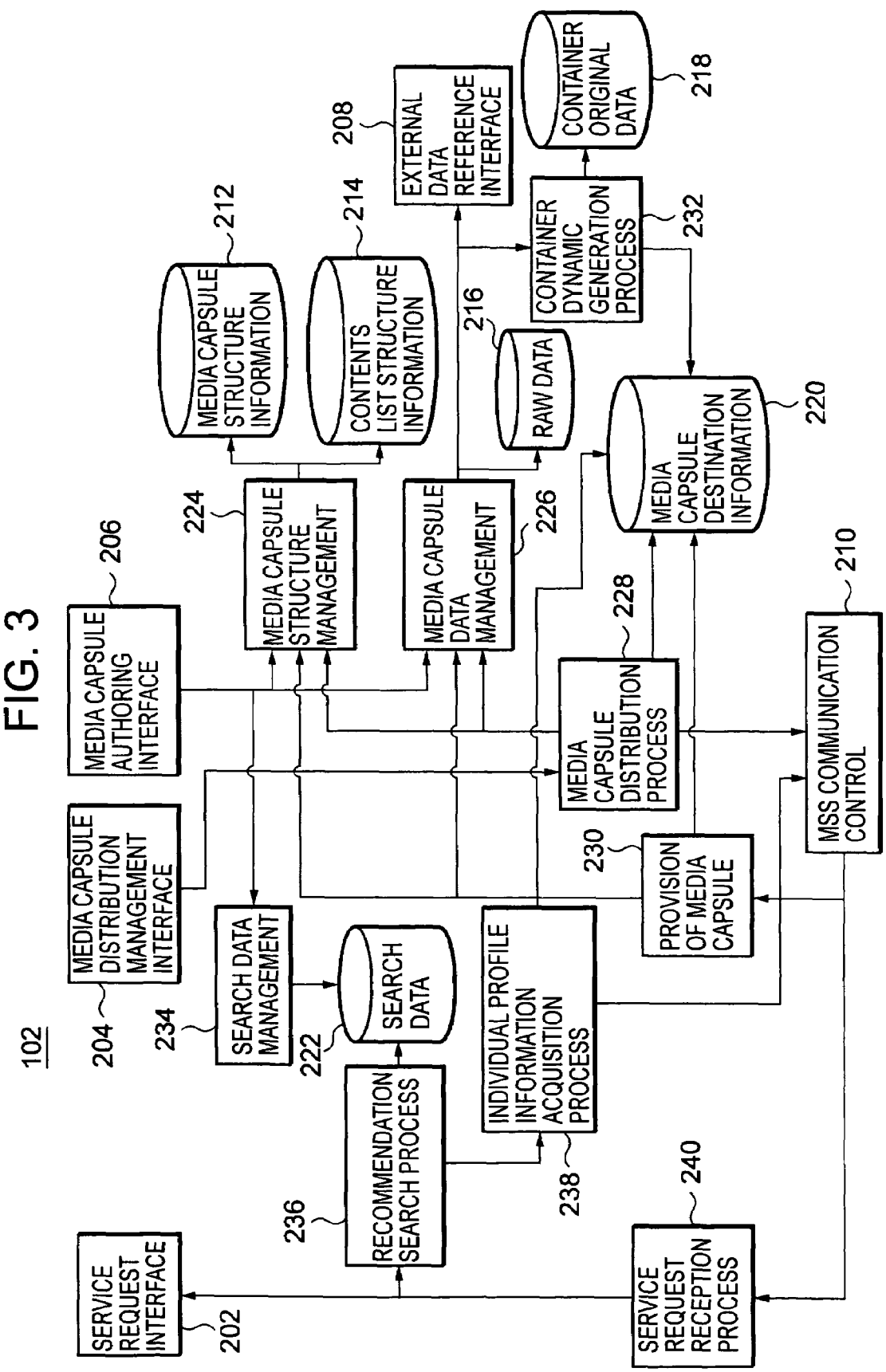
FIG. 3 is a block diagram showing a structure of a media capsule provision server in the preferred embodiment.

Media Capsule Provision Server:

As shown in FIG. 3 the media capsule provision server 102 comprises interfaces with external devices, such as a service request interface 202, a media capsule distribution management interface 204, a media capsule authoring interface 206, an external data reference interface 208, and a my storage server communication control 210, etc. A media capsule structure information database (DB) 212, a contents list structure information database (DB) 214, a RAW data database (DB) 216, a container original data database (DB) 218, a media capsule destination information database (DB) 220, a search data database (DB) 222, etc. are stored in an internal storage device or an external storage device of the media capsule provision server 102. Furthermore, the media capsule provision server 102 comprises media capsule structure management means 224, media capsule data management means 226, media capsule distribution process means 228, media capsule provision means 230, container dynamic generation process means 232, search data management means 234, recommendation search process means 236, individual profile information acquisition processing means 238, service request reception process means 240, etc., as means for processing the data stored in the above-mentioned database. Each function will be described hereafter.

The service request interface 202 is an interface which acquires a service request which is a method operating on the media capsule provision server 102 as defined for the media capsule, from an information processing apparatus other than the media capsule provision server 102. An example of the service request possessed by an information processing apparatuses other than the media capsule provision server 102 is a search of a media capsule carried out by the recommended engine 112 which the service provision system 110 has, for example, as shown in FIG. 1.

The media capsule distribution management interface 204 is an interface for an information processing apparatus, etc. which requests the media capsule provision server 102 to distribute the media capsule, and which is other than media capsule provision server 102. It requests the media capsule distribution process means to distribute the media capsule. The information processing apparatus other than the media capsule provision server 102 means the service provision system 110 held by the service provider, such as for example an MC distribution operating system, a content sales management system, etc.

The media capsule authoring interface 206 is an interface with an information processing apparatus, etc. which maintains and supplies the original data of the media capsule to the media capsule provision server 102, and which is other than the media capsule provision server 102. It maintains and supplies the data to the media capsule structure information database 212, the contents list structure information database 214 and the RAW data database 216.

The external data reference interface 208 is an interface for referring to the content entity which is stored in an information processing apparatus, etc. other than the media capsule provision server 102.

The my storage server communication control 210 controls the communication with the my storage server 104 through the communications network 108.

Among the metadata, the metadata about the distribution management of contents and media capsule use management are stored in the media capsule structure information database 212. The metadata about distribution management means a metadata to be added in order to manage the distribution when distributing contents through the communications network 108 by distributing the image data, the music data, etc. Examples are an issuer of the content, an issue date and hour, a validated date, etc. The metadata about media capsule use management means a metadata required when the media capsule is used in order that a user may refer to, search for, etc. the content at the client terminal 106, etc. Examples are attribute data, such as a title of the media capsule, a language used at the time of media capsule creation, a search key indicating a feature of the media capsule, and operational information corresponding to an operation for the media capsule, etc.

Among the metadata, the metadata about the data (logical contents list) included in the media capsule is stored in the contents list structure information database 214. The logical contents list means a bundle of physical contents data (Raw data) including control information. It is a logical unit of the data used by a user. It is possible to include a plurality of contents in one contents list. Examples of the metadata with respect to the logical contents list are a data identifying the logical contents list, a search key for contents search, and a thumbnail image corresponding to contents, etc. In addition, "the logical contents list" is only referred to as a "contents list" in the drawings.

The metadata about each content, such as an access type to a content, an address of the content, etc. are stored in the RAW data database 216. Further, the content entity may be stored. The structure of the media capsule will be mentioned in detail later. In addition, the media capsule database (Media Capsule Database) as shown in FIG. 1 includes the media capsule structure information database 212, the contents list structure information database 214, and the RAW data database 216. Further, the media capsule structure information database 212, the contents list structure information database 214, and the RAW data database 216 are constructed as an example of the metadata memory means. Furthermore, when a container does not contain different metadata for each user, an included media capsule list (also referred to as MC list in the drawings) required when generating the media capsule container (also referred to as MC container in the drawings) having stored therein a plurality of media capsules is stored in the RAW database 216.

The container original data database 218 stores therein original data for generating the included media capsule list required when generating the media capsule container having stored therein the plurality of media capsules such that a user may customized it. The media capsule container is an example of a container including therein a plurality of the metadata packages. In particular, when the media capsule list is created, information data (ID, etc.) identifying a candidate media capsule included in the media capsule list and data used for determining whether to actually include the media capsule are stored. As an example, considering that the media capsule container corresponding to a content catalog, for example, an ID of the media capsule which plays a role of the flier of the content to be contained in the catalog is stored in an original data database. As to data for determination, the ID of the media capsule is stored which is distributed when a content is actually purchased in view of the flier, whereby only the contents which have not been purchased yet can be described in the catalog.

The media capsule destination information database 220 is constructed as an example of the metadata package destination information storage means. Possessor-user information on the media capsule is stored. The possessor-user information means information indicating which user possesses which media capsule in what type of situation. For each media capsule, information identifying the user who distributed the media capsule (for example, user ID, etc.) and a distribution status (for example, a term during which the user can use the media capsule, etc.) are managed.

A data for a recommendation search is stored in the search data database 222. Besides providing the media capsule according to a request from the user, the media capsule provision server 102 has functions of recommending a media capsule containing the contents in accordance with each user's taste or a push-type distribution function. Search data which are required when searching the contents in accordance with each user's taste are stored in the search data database 222 as the data for the recommendation search. The data for recommendation search include media capsule attribute data, such as a characteristic vector of the content contained in the media capsule, a user's individual profile acquired from the my storage server 104, etc. The individual profile will be described later.

The media capsule structure management means 224 manages the media capsule structure information data according to instructions from an authoring interface. Based on a request from the media capsule provision means 230, it acquires the media capsule structure information data from a media capsule structure information data database, so as to be supplied to the media capsule provision means 230. Further, when the media capsule structure management data are updated, the updated data are notified to the my storage server 104 through the my storage server communication control means 210.

The media capsule data management means 226 manages the RAW data database 216 according to instructions from the authoring interface. Based on a request from the media capsule provision means 230, it acquires the content entity from the RAW data database 216, so as to be supplied to the media capsule provision means 230. Alternatively, it refers to an address, etc. of a content stored in the RAW data database 216 and calls an external logic through the external data reference interface 208

The media capsule distribution process means 228 is constructed as an example of the metadata package distribution means. Based on a request from the media capsule distribution management interface 204, it distributes the media capsules to the client terminal 106 used by the user through the my storage server 104, exchanges them, or recovers them. When the media capsule already distributed to the user is changed by a media capsule issuer, such as a service provider, etc., "exchanging the media capsules" is understood to mean the distribution of the changed media capsules to the above-mentioned user again. The recovery of the media capsules means that, for example, a valid term during which the user can use the media capsule is defined in advance, and the above-mentioned media capsule is taken away from the user when the valid term elapses.

The media capsule provision means 230 is constructed as an example of metadata package creation means. Based on a request from the my storage server 104, it acquires the metadata from the above-mentioned media capsule structure management means 224 and the media capsule data management means 226, respectively. According to the acquired metadata, it constructs a media capsule so as to be provided to the my storage server 104 through the my storage server communication control 210.

The container dynamic generation process means 232 is constructed as an example of the container generation means and creates a list of the media capsules included in the media capsule container, the list being required when the media capsule container stored therein a plurality of media capsules is generated. In this case, it is possible to refer to the possessor-user information on the media capsule stored in the above-mentioned media capsule destination information database 220 so that the media capsule which is not distributed to the user can be included in the container for each user.

The search data management means 234 manages the data for recommendation search stored in the search data database 222 according to instructions from the authoring interface.

The individual profile information acquisition processing means 238 requests an individual profile information from the my storage server 104, and acquires the above-mentioned individual profile information. The individual profile information includes user profile information, such as each user's age and gender managed in the my storage server 104, and a feature vector extracted in the my storage server 104 by using the individual metadata for each user including information on the media capsule used by each user, evaluation information on the media capsule set up by the user for each media capsule, etc., the feature vector reflecting the user's taste, etc.

The recommendation search process means 236 returns the data for recommendation search stored in the search data database 222 and the search results optimized for each user by the above-mentioned individual profile acquired from the my storage server. For example, the search process provides the search results optimized for each user by comparing the feature vector of the contents contained in the media capsule which is an example of the data for recommendation search stored in the search data database 222, with the feature vector reflecting the user's taste shown by the individual profile.

The service request reception process means 240 receives the service request which is the method operating on the media capsule provision server 102 as defined for the media capsule, from the my storage server 104 through the my storage server communication control 210.

The structure of the media capsule provision server 102 in accordance with the preferred embodiment is described above. Next, the structure of the my storage server 104 in accordance with the preferred embodiment will be described based on FIG. 4.

Figure 4:
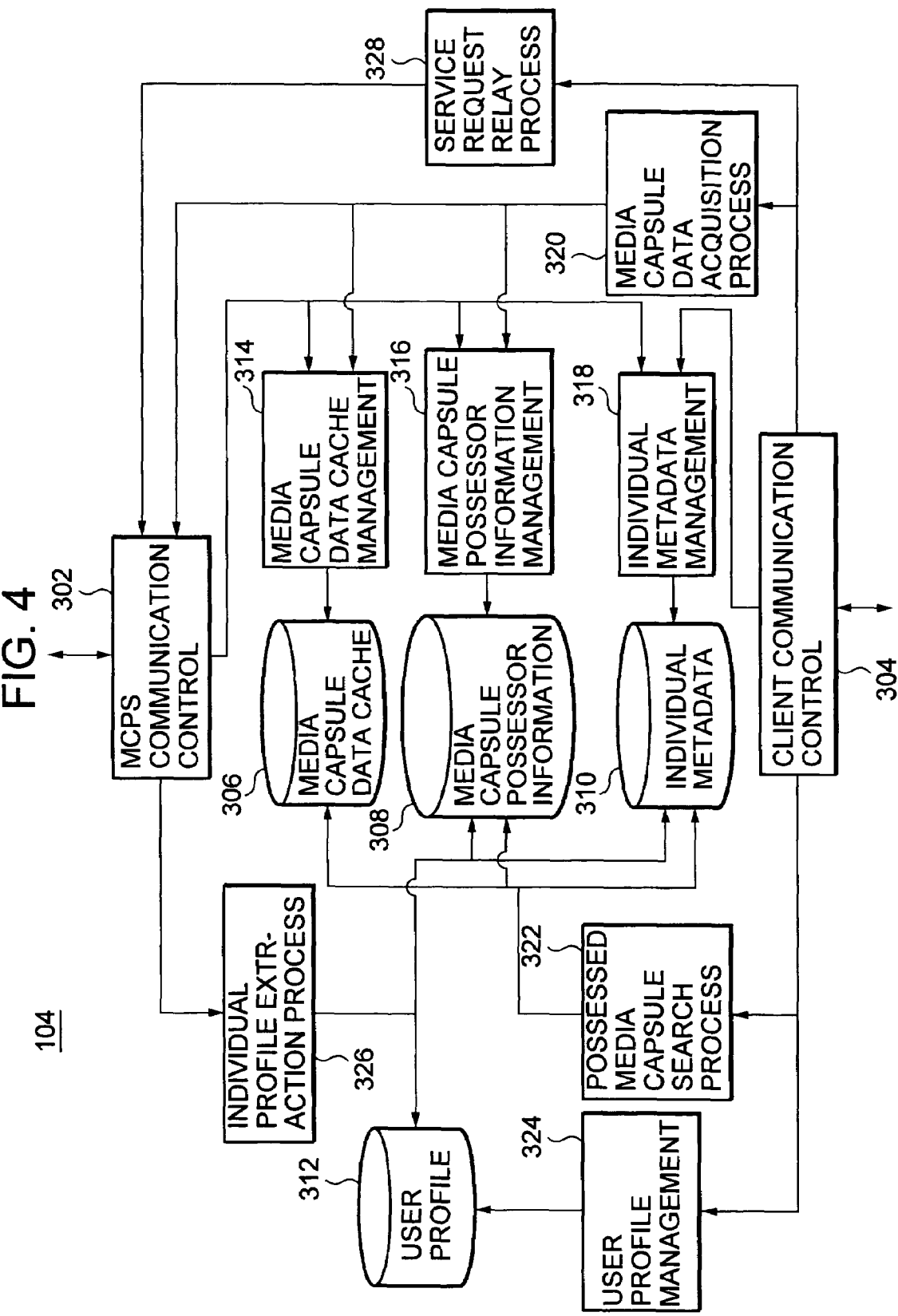
FIG. 4 is a block diagram showing a structure of a my storage server in the preferred embodiment.

My Storage Server:

As shown in FIG. 4 the my storage server 104 comprises the media capsule provision server communication control 302, the client terminal communication control 304, etc., as an interface with an external device. A media capsule data cache database 306, a media capsule possessor information database 308, an individual metadata database 310, a user profile database 312, etc. are stored in the internal storage device or the external storage device of the my storage server 104. Furthermore, as means for processing the data stored in the above-mentioned database, the my storage server 104 comprises media capsule data cache management means 314, media capsule possessor information management means 316, individual metadata management means 318, media capsule data acquisition processing means 320, possessed media capsule search process means 322, user profile management means 324, individual profile extraction process means 326, service request relay process means 328, etc. Each function will be described below.

The media capsule provision server communication control 302 controls communications with the media capsule provision servers 102 through the communications network 108. The client terminal communication control 304 is constructed as an example of a transmission means, and controls communications with the client terminals 106 through the communications network 108.

The media capsule data cache database 306 is constructed as an example of a metadata package memory means. Among the media capsule and the metadata packaged as a media capsule, the metadata needed in order that a user may search his or her possessed media capsule, such as the media capsule structure information, etc. is stored in the media capsule data cache database 306. For example, an ID assigned to each media capsule so as to be unique in the metadata distribution management system 100 in accordance with the preferred embodiment or a search key indicating a feature of the media capsule is stored in the media capsule data cache database 306.

The information on the media capsule possessed by the user is stored in the media capsule possessor information database 308. The "to possess" means a state where the media capsule distributed from the media capsule provision server 102 is held in the my storage server 104. In particular, the information data, such as an ID identifying a user, and the information data, such as an ID identifying a media capsule are linked and stored, so that one can know which user possesses which media capsule.

Including information on the media capsule used by the user, evaluation information, on the media capsule, set up by the user for each media capsule, etc., the individual metadata for each user and for each media capsule is stored in the individual metadata database 310.

Information data on a user, such as for example the user's gender, age, etc., are stored in the user profile database 312.

Corresponding to the distribution of the media capsule from the media capsule provision server 102, the updating, etc., the media capsule data cache management means 314 maintains the information data stored in the media capsule data cache database 306 in a suitable state, for example, the updated state.

Corresponding to the distribution of the media capsule from the media capsule provision server 102, the recovery, etc., the media capsule possessor information management means 316 appropriately manages the possessor information on the media capsule.

Based on a request from the client terminal 106, the individual metadata management means 318 sets up and operates the individual metadata. Alternatively or in addition, for example, when the media capsule is distributed from the media capsule provision server 102, the acquisition date and hour of the media capsule, etc. is set up as the individual metadata.

The media capsule data acquisition processing means 320 is constructed as an example of the metadata package acquisition means. Based on the request from the client terminal 106, it acquires the media capsule or the data contained in the media capsule from the above-mentioned media capsule data cache database 306 or the media capsule provision server 102.

Based on a search condition expression provided by the client terminal 106, the possessed media capsule search process means 322 searches the possessed media capsule for a corresponding media capsule.

The user profile management means 324 stores the user information, such as the user's gender, age set up by the user through the client terminal 106, in the above-mentioned user profile database 312, updates it, and manages it.

With reference to the above-mentioned user profile database 312, a meta-capsule possessor information database, and the individual metadata database 310, the individual profile extraction process means 326 extracts and creates the individual profile including the feature vector which reflects the user's taste. In particular, the user's taste is generally determined from the feature common to the media capsules which the user possesses, an evaluation set up by the user with respect to the media capsules, the user's gender and age, etc., for example. The individual profile is used for searching, generating, and recommending the media capsule containing the contents in accordance with the user's taste for each user in the media capsule provision server 102.

The service request relay process means 328 relays the service request which is the method operating on the media capsule provision server 102 as defined for the media capsule from the client terminal 106 to the media capsule provision server 102.

The structure of the my storage server 104 in accordance with the preferred embodiment is described above. Next, a structure of the client terminal 106 in accordance with the preferred embodiment will be described based on FIG. 5.

Figure 5:
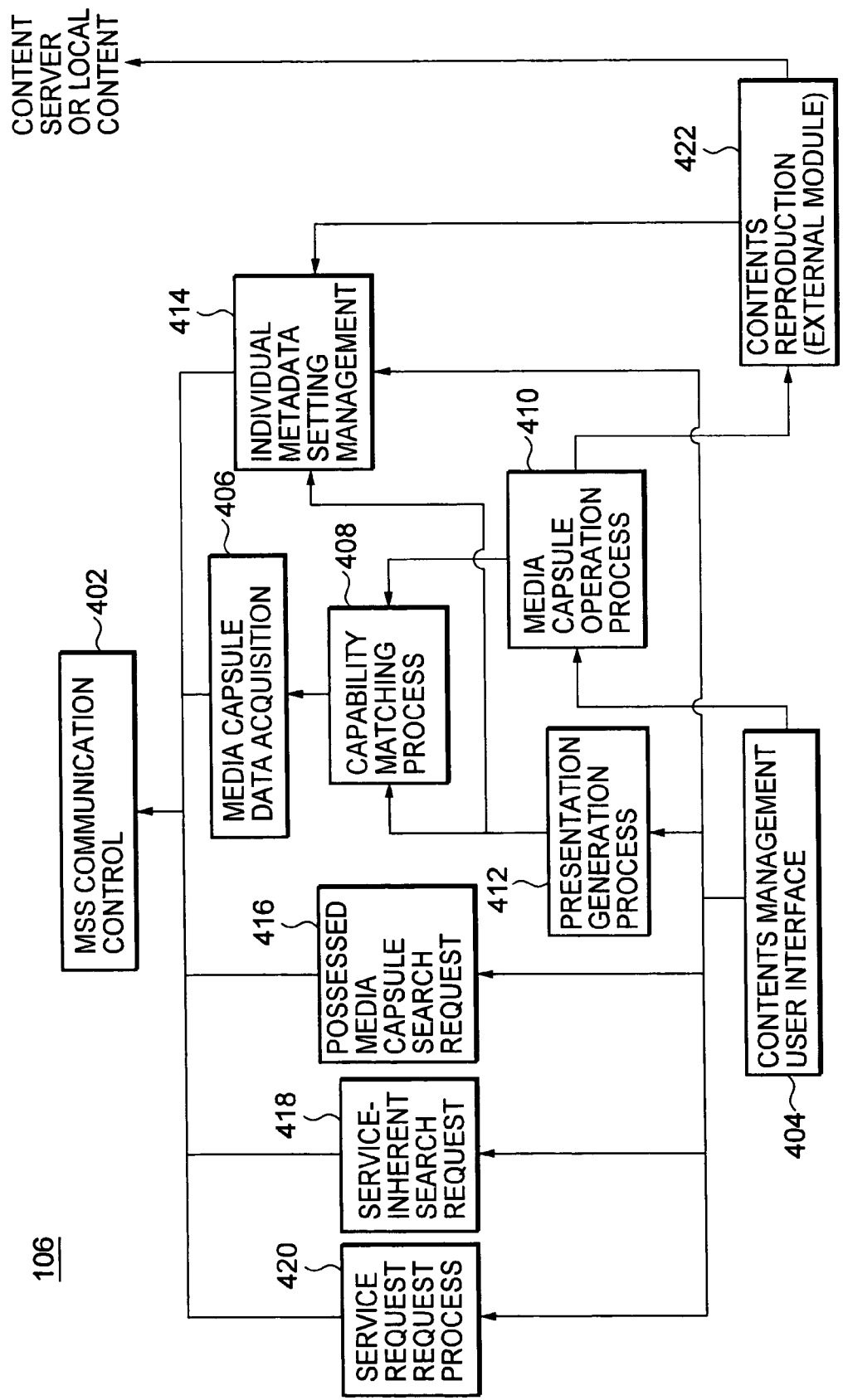
FIG. 5 is a block diagram showing a structure of a client terminal in the preferred embodiment.

Client Terminal:

As shown in FIG. 5 the client terminal 106 comprises a my storage server terminal communication control 402 as an interface with the external device, and further comprises a contents management user interface 404 as an interface with the user who uses the client terminal 106. Moreover, in order to process the media capsule, etc. in accordance with the preferred embodiment, the client terminal 106 comprises media capsule data acquisition means 406, capability matching process means 408, media capsule operation process means 410, presentation generation process means 412, individual metadata setting management means 414, possessed media capsule search request means 416, service-inherent search request means 418, service-request request process means 420, etc. It further comprises content reproduction means 422 for reproducing content entity acquirable by processing the media capsule, such as digital contents including an image data, a music data, a video data, etc., for example.

The my storage server terminal communication control 402 controls communication with the my storage servers 104 through the communications network 108.

The contents management user interface 404 comprises display means, such as a display attached to the client terminal, and input means, such as a keyboard, a mouse, a controller for a television set, etc. It receives information data from the user using the metadata distribution management system 100 in accordance with the preferred embodiment through the client terminal, and also provides information to the user.

The media capsule data acquisition means 406 is constructed as an example of the metadata package acquisition means. Based on the request inputted by the user through the above-mentioned contents management user interface 404, it acquires the metadata included in the media capsule or the media capsule, from the my storage server 104 or from the media capsule provision server 102 through the my storage server 104.

Referring to the metadata acquired by the above-mentioned media capsule data acquisition means 406, the capability matching process means 408 determines whether or not the contents indicated by the above-mentioned metadata are available at the client terminal 106.

The media capsule operation process means 410 is constructed as an example of the metadata package operation processing means. Based on the determination results of the above-mentioned capability matching process means 408, it provides the content reproduction means 422 with the address information about the contents which are available at the client terminal 106, etc. Based on the above-mentioned address information data, etc., the content reproduction means 422 acquires and reproduces the contents.

The presentation generation process means 412 creates an expression on the contents management user interface 404 of the media capsule from the data packaged as the logical contents list in the media capsule or from the media capsule structure information.

Based on a request from the user, the individual metadata setting management means 414 transmits the individual metadata, such as evaluation information with respect to the media capsule, to the my storage server 104. In addition, the date and hour of content reproduction, etc. can also be caused to be the individual metadata when the contents are reproduced by the content reproduction means 422.

Based on the request from the user, the possessed media capsule search request means 416 transmits the search condition expression set up by the user to the my storage server 104, and causes the my storage server 104 to search the possessed media capsules for a corresponding media capsule.

The service-inherent search request means 418 issues a search request corresponding to a search logic (including a recommendation process) with respect to the media capsule, the search logic being realized on the media capsule distribution side, such as the service provision system 110, etc., and disclosed by the media capsule provision server 102.

The service-request request process means 420 requests a service-request from the media capsule provision server 102 through the my storage server 104.

Figure 6:
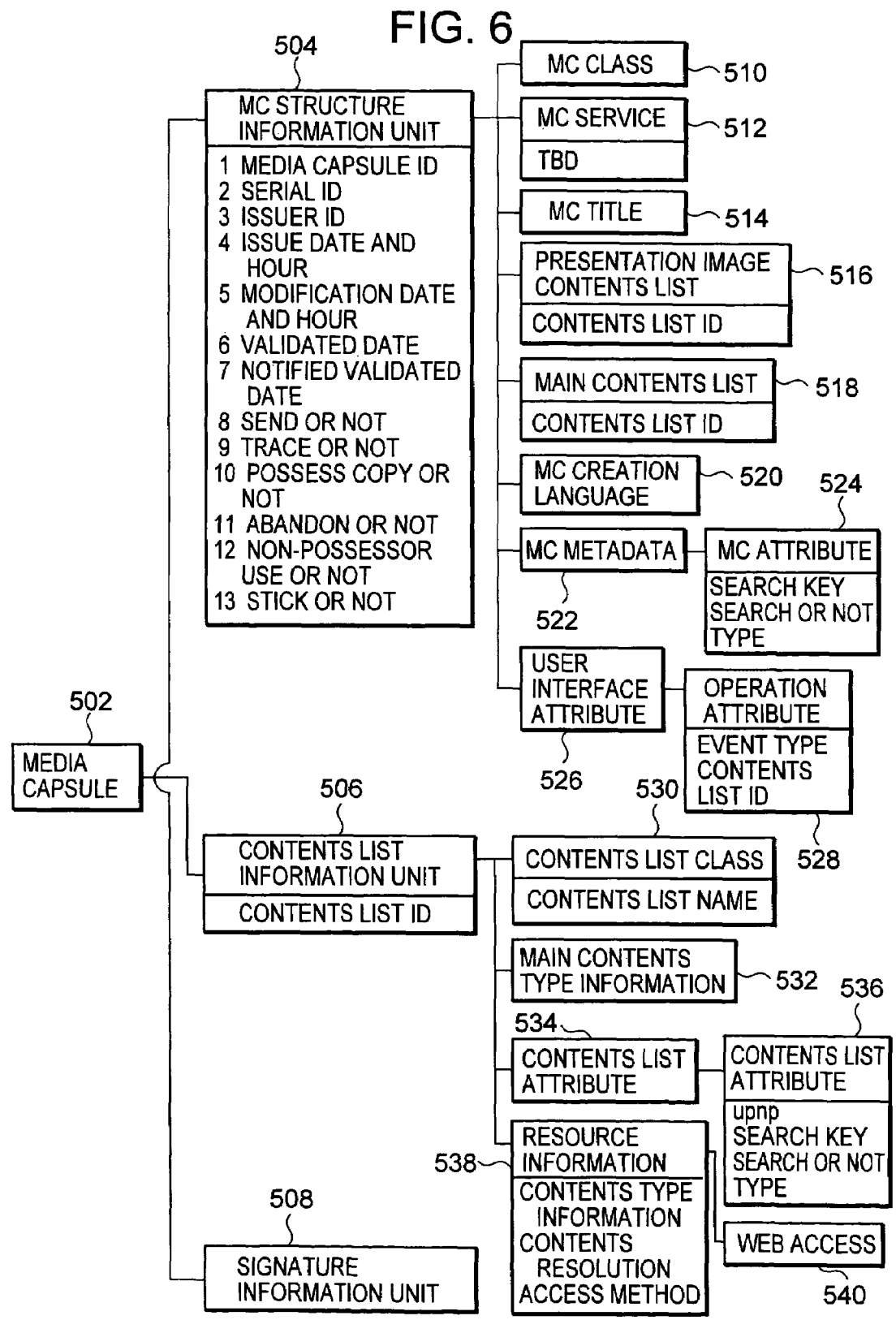
FIG. 6 is a block diagram showing a structure of a media capsule in the preferred embodiment.

The structure of the client terminal 106 is described above. Next, a structure of the media capsule in accordance with the preferred embodiment will be described based on FIG. 6. FIG. 6 is a block diagram showing a data structure of the media capsule distributed and used in the metadata distribution management system 100 in accordance with the preferred embodiment.

Media Capsule Data Structure:

A media capsule 502 is arranged to have a plurality of metadata packaged therein. As shown, the media capsule 502 is constituted by a MC structure information unit 504 which shows structure information on the media capsule, a contents list information unit 506 which shows information about a logical contents list contained in MC structure information 504, and a signature information unit 508 for signature information with respect to the whole media capsule.

The MC structure information unit 504 includes the metadata which shows basic information and distribution control information on the media capsule. Referring to the drawings, the metadata which can be included in MC structure information unit 504 will be described. In addition, English notations as shown in parentheses ( ) in the following description correspond to a sample diagram of the media capsule structure in FIGS. 7A to 7D.

Examples of the metadata showing the basic information on the media capsule are a media capsule ID (mcid), a serial ID (serialId), an issuer ID (issuer), an issue date and hour (issueDate), a modification date and hour (modificationDate), a validated date (validForm and validUntil), a notified validated date (notificationFrom and notificationUntil), etc.

The media capsule ID is an ID uniquely assigned to each media capsule in the metadata distribution management system 100 in accordance with the preferred embodiment. It is a metadata for identifying the media capsule.

The serial ID is an ID uniquely assigned to one media capsule ID. For example, it is assigned when the media capsule is copied.

The issuer ID is an ID of the issuer issuing the media capsule, and is the metadata for identifying the service provider in the metadata distribution management system 100 in accordance with the preferred embodiment, because the service provider issues the media capsule.

The issue date and hour is the metadata indicating the date and hour when the media capsule is issued first.

The modification date and hour shows the latest date and hour when the media capsule is updated. It is the metadata which is updated each time the issuer, etc. changes the already issued media capsule. The media capsule data cache management means 314 which is a constituent element of the my storage server 104 refers to the metadata of the modification date and hour, so as to manage a suitable status of the information stored in the media capsule data cache database 306, such as by maintaining it always in the newest state, corresponding to the distribution or update of the media capsule from the media capsule provision server 102 as mentioned above.

The validated date is constituted by a combination of the metadata of the date and hour when the media capsule becomes available and the metadata of the date and hour when it becomes unavailable. By setting up the validated date, it becomes possible to rent the contents like a so-called rental video shop, in such a way that a service provider allows a user to use a content only during a fixed period, for example.

The notified validated date is constituted by a combination of the start date and hour and the ending date and hour which are notified to the media capsule. It is used when it is desired to highlight the presentation of the media capsule for a specified period. In particular, it notifies that the information is updated by bordering the periphery of a thumbnail image in red, etc., for example.

By including the metadata which shows the basic information on the above-mentioned media capsule in the media capsule, the management of the media capsule in the media capsule provision server 102 or the my storage server 104 is facilitated, and further the basic information can be regarded as a search key when searching the plurality of media capsules for a media capsule desired by the user.

As the metadata showing the distribution control information on the media capsule may be "send or not (send)", "trace or not (trace)", "plural possessions or not (plural), "abandon or not (abandon)", "non possession use or not (nonpossess)", "stick or not (stick), etc., for example.

The "send or not" is a metadata indicating whether a user who acquires a media capsule from the media capsule provision server 102, and holds it in the my storage server 104 can send the above-mentioned media capsule to another user or not. By possessing the "send or not" as the metadata, it is possible to prevent the media capsule from being provided to a user who originally cannot obtain the above-mentioned media capsule. In particular, a first user who purchases a content, such as for example a pay movie provided by a service provider, and acquires the media capsule required in order to use the above-mentioned content is prevented from providing the acquired media capsule to a second user who does not purchase the above-mentioned contents, and the second user who cannot originally refer to the content is prevented from referring to the content by means of the media capsule acquired from the first user.

The "trace or not" is a metadata indicating whether or not it is necessary to trace a distribution channel of the media capsule. The distribution channel of the media capsule indicates which user possesses, sends, or recovers the issued media capsule. The trace of the distribution channel shows the use status of the media capsule, etc.

The "plural possessions or not" is a metadata indicating whether or not one user can possess a plurality of identical media capsules.

The "abandon or not" is a metadata indicating whether or not the media capsule acquired once by the user can be abandoned.

The "non possession use or not" is a metadata indicating a non-possession status, that is whether or not the user who does not hold any in the my storage server 104 can use a media capsule.

The "stick or not" is a metadata indicating whether or not a media capsule can be held in a memory of the client terminal used by a user, etc. in order that the user who is not connected to a network may use a media capsule.

By including the metadata indicating the distribution control information on the above-mentioned media capsule in the media capsule, the media capsule provision server 102 or the my storage server 104 can manage the distribution of the media capsules, and further the media capsule issuer can control the user's media capsule and the use of the content entities.

The metadata relating to the media capsule structure information can be further added to the MC structure information unit 504. The metadata relating to media capsule structure information will be described with reference to the drawings.

A media capsule class 510 is a metadata which shows a type of a media capsule.

A media capsule title 514 is a metadata indicating a title of a media capsule.

A presentation image contents list 516 is a metadata with respect to the logical contents list of the images used in case the media capsule is displayed on the display means included in the contents management user interface 404 of a user's client terminal. An ID of the logical contents list is specified which is unique in the media capsule. The "logical contents list" means the bundle of physical contents data (Raw data) including the control information as mentioned above. Therefore, the logical contents list is included in a contents list unit 506 which is one of the constituent elements of the media capsule 502, the contents containing image data, such as a thumbnail image used when displaying the media capsule. For the presentation image contents list 516, a contents list ID of the logical contents lists is specified.

A main contents list 518 is a metadata with respect to the logical contents list used for the main purpose of the media capsule, and an ID of the logical contents list which is unique in the media capsule is specified. In other words, for example, when the media capsule relates to a movie, the contents list unit 506 which is one of the constituent elements of the media capsule 502 includes, for example, a logical contents list (where a text data of a review of the movies is provided in contents), a logical contents list (where an image data of a leading actor of the movie is provided in contents), and a logical contents list (where address information in which a video data of the movie itself is stored is provided in contents). In this case, the logical contents list (where the address information in which the video data of the movie itself is stored is provided in contents) is the main contents list, and an ID of the logical contents list is assigned to the main contents list 518.

A media capsule creation language 520 sets up language information data used when creating the media capsule.

A media capsule attribute 524 is a metadata having specified a search key (key) in case the media capsule are subjected to a search, "search or not (searchable)", etc. If a word, etc. which shows characteristics of the media capsule is set up as a search key, the search in accordance with the user's request can be performed easily.

A user interface attribute 526 is a metadata having specified operational information on the above-mentioned logical contents list corresponding to the operation performed by the user through an input means, etc. with respect to the logical contents list containing the contents displayed on the display means of the contents management user interface 404 of the client terminal 106. The operational information of the logical contents list is particularly specified by way of the operational attribute 528. A contents list ID (payload) of the logical contents lists corresponding to the operation performed through the contents management user interface 404 and an event type (event) of the above-mentioned operation are set up in the operational information 528. For example, the logical contents list to be started when a user chooses a media capsule with an input means, etc. can be specified by the ID.

Next, the contents list information unit 506 showing the information data relating to the logical contents list will be described. The contents list ID's for all the logical contents lists contained in the media capsule are set up in the contents list information unit 506. The contents list ID's are uniquely assigned to all the logical contents lists respectively in the media capsule. The media capsule in accordance with the preferred embodiment can include a plurality of logical contents lists as mentioned above. Thus, one media capsule can include the logical contents list about the related information of the contents, etc., other than the logical contents list about the contents which are the main targets of the media capsule. In particular, for example, when the service provider who distributes a movie as a video content to a user through the communications network 108 generates the media capsule A, at first the logical contents list an including information data, such as the addresses of the above-mentioned video contents, is enclosed in the media capsule A, because the contents which are the main targets of the above-mentioned media capsule A are the video contents of movies. In addition to this, as for the related information on the movies, for example, if it is desired to provide the user with a leading actor's still image, music data of a movie theme song, etc., the media capsule A can include information (address, etc.) about the above-mentioned still image and music data as separate logical contents lists b, c respectively.

For each contents list ID set up in the contents list information unit 506, a metadata about its logical contents list can be set up. The metadata which can be set up may include a contents list name 530, type information 532 on the contents contained in the logical contents list, a contents list attribute 536 which is a search data used when searching the logical contents list, and resource information 538 which is an information data about the contents contained in the logical contents list. The resource information 538 may include, for example, type information on a content (contentType), a resolution of the content, an access method (access) to the content, etc. The type information on the content may include, for example, a data indicating whether the content is a still images, a video, or music, etc. The access method to the content may be, for example, an address of a position where the content entity is stored.

Finally, the signature information unit 508 for the signature information data with respect to the whole media capsule will be described. The signature information unit is used for proving the correctness of the above-mentioned media capsule in such a way that the issuer of the media capsule performs electronic signature, etc. The media capsule may include any metadata other than the above-mentioned metadata.

The structure of the media capsule has been described above. In addition, FIG. 7A to FIG. 7D show a sample of a media capsule which is described in the XML language in accordance with the preferred embodiment.

Next, a distribution process flow of the media capsule in the metadata distribution management system 100 in accordance with the preferred embodiment will be described based on FIG. 8.

Media Capsule Distribution Process:

Firstly, in step S102, a distribution operating server distributes a media capsule to the media capsule provision server 102 (step S102). In this case, information identifying a destination, such as a destination user's ID, is added to the media capsule. The distribution operating server means an information processing apparatus other than the media capsule provision server 102 which is held by the service provider who holds and manages the media capsule provision server 102 in the preferred embodiment. For example, it is a server which performs merchandise management and sales management. It is assumed, for example, a user purchases contents, such as a movie provided by a service provider, the purchase information is accumulated in the distribution operating server which performs sales management, and the distribution operating server distributes a media capsule about the purchased contents to the purchase user with reference to the above-mentioned purchase information, etc.

The media capsule provision server 102 to which the media capsule is distributed registers a destination user and information identifying the media capsule to be distributed, with the media capsule destination information database 220 in step S104. The possessor information with respect to the above-mentioned media capsule of the above-mentioned user is set as "during distribution" (step S104).

Next, in step S106, the media capsule provision server 102 distributes the media capsule and the destination user's information to the my storage server 104 (step S106). The my storage server 104 to which the media capsule is distributed stores the media capsule (MC) structure information on the media capsule distributed in step S108 in the media capsule data cache database 306 (step S108). Then, the my storage server 104 registers the destination user and information identifying the distributed media capsule, with the media capsule (MC) possessor information database in step S110. Next, the user's individual metadata is registered with the individual metadata database 310 in step S112. The individual metadata to be registered means an acquisition date and hour when the above-mentioned user acquired the above-mentioned media capsule.

Subsequently, the my storage server 104 transmits the notice of the completion of distribution to the media capsule provision server 102 in step S114. Having received the notice of the completion of distribution, the media capsule provision server 102 updates a media capsule distribution information destination database in step S116. The updating means in particular changing the possession status of the user from the set up "during distribution" in step S104 to "under possession", etc. An update process allows management of the user's media capsule possession status in the media capsule destination information database 220. Finally, in step S118, the media capsule provision server 102 transmits the notice of the completion of distribution to the distribution operating server (step S118).

The distribution process flow of the media capsule has been described above. Next, a search flow of the possessed media capsule in the metadata distribution management system 100 in accordance with the preferred embodiment will be described based on FIG. 9.

Possessed Media Capsule Search Process:

The possessed media capsule search process means a process performed when acquiring a desired media capsule out of media capsules possessed by a user, that is, the media capsules held by the user in the my storage server 104.

Firstly, in step S202, the user inputs a search key, etc. through the input means of the client terminal 106 (step S202). In step S204, the client terminal 106 transmits a media capsule search request having set up a specified search key to the my storage server 104 (step S204).

When receiving the search request, the my storage server 104 searches the data stored in the MC possessor information database, the individual metadata database 310, and MC data cache database, by means of using the specified search key (step S206). As a result of the search, a list of information (ID, etc.) identifying the media capsule which matches the search key is created in step S208, and the list is transmitted to the client terminal 106 (step S208). In this case, it is possible to transmit not only the list of ID's but also other metadata contained in the media capsule at a time. The client terminal 106 receives the list which is the search result in step S210, and displays the search result on the display means (step S212). As to how to show the search result to the user, according to the ID of the media capsule, other metadata, etc. contained in the above-mentioned media capsule may separately be acquired from the my storage server 104, etc., and a display screen may be constructed based on the above-mentioned metadata.

The search flow of the possessed media capsule is described above. Next, a flow of recommendation search is described based on FIG. 10.

Recommendation Search Process:

The recommendation search process means a process in which, based on each user's taste, the media capsule provision server 102 searches for the optimal media capsule for each user, and recommends it to the user.

Firstly, as the premise that the recommendation search process is performed, in step S302, the my storage server 104 transmits individual profile information to the media capsule provision server 102 (step S302), and the media capsule provision server 102 acquires a user's individual profile (step S304). As mentioned above, the individual profile information includes the individual metadata, such as evaluation information on the media capsule transmitted by the user to the my storage server 104 through the client terminal 106, user's possessed media capsule information managed by the my storage server 104 in the possessor information media capsule database, the feature vector which shows the user's taste and is extracted from the profile information, such as user's gender managed in the user profile database 312, etc.

In step S306, the user requests the client terminal 106 to display a recommended MC (media capsule) (step S306). In step S308, the client terminal 106 transmits a service-inherent search request to the media capsule provision server 102 (step S308) through the my storage server 104 (step S310).

In step S312, the media capsule provision server 102 carries out a recommendation search process with reference to the above-mentioned individual profile information and the search data database 222 (step S312). In particular, a media capsule in accordance with the user's taste is chosen by comparing the user's feature vector with the feature vectors of the media capsules stored in the search data database 222, etc. Then, in step S314, the media capsule provision server 102 transmits an ID of the media capsule, etc. to the client terminal 106 (step S314) through the my storage server 104 as search results (step S316). When acquiring the search results in step S318, the client terminal 106 displays the search results on the display means as recommended results, etc. in step S320. How to show the search results to the user is described in step 212 of FIG. 9, and therefore will not be repeated.

The recommendation search flow is described above. Next, a media capsule data acquisition flow will be described based on FIG. 11A and FIG. 11B.

Media Capsule Data Acquisition Process:

The media capsule data acquisition process means a process in which the client terminal 106 acquires the metadata enclosed in the media capsule from the media capsule provision server 102 through the my storage server 104 or the my storage server 104. Firstly, a case where the metadata about the media capsule structure information is acquired out of the metadata enclosed in the media capsule, will be described with reference to FIG. 11A. Next, a case where the metadata with respect to the Raw data and the Raw data (content entity) are acquired will be described with reference to FIG. 11B.

Figure 11A:
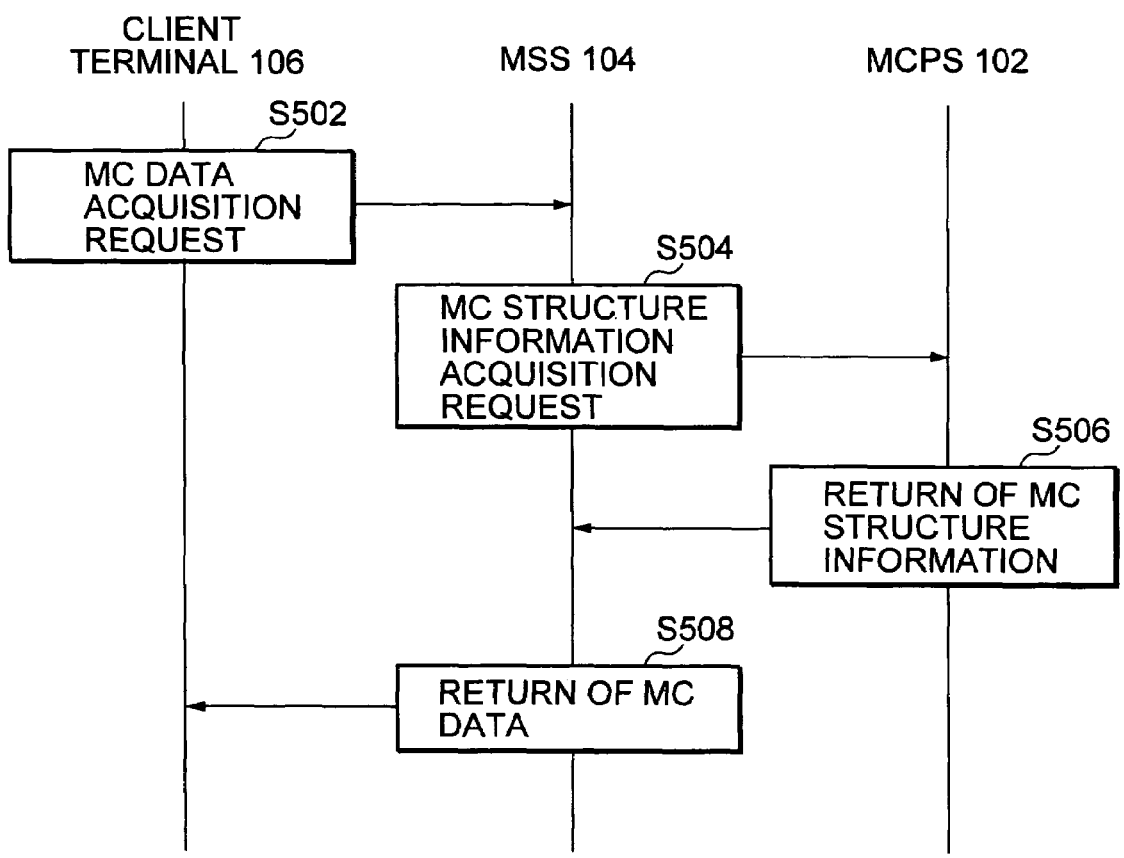
FIG. 11A is a process flow chart having shown a media capsule data acquisition process in the preferred embodiment.

At first, in step S502 of FIG. 11A, the client terminal 106 transmits a media capsule data acquisition request to the my storage server 104 (step S502). The data to be requested and acquired may be a metadata relating to the media capsule structure information, a main contents list metadata, a media capsule attribute metadata, etc. When requesting, the media capsules such as the media capsule ID are transmitted together with uniquely identifiable information, so that the my storage server 104 may know which metadata in which media capsule is requested.

At first, the my storage server 104 checks whether the requested data has been cached in the media capsule data cache database 306 within the my storage server 104. When it is not cached, a media capsule structure information acquisition request is transmitted to the media capsule provision server 102 in step S504. In step S506, the media capsule provision server 102 transmits the structure information on the media capsule with a requested ID to the my storage server 104 (step S506). The my storage server 104 transmits, to the client terminal 106, the metadata requested by the client terminal 106 out of the media capsule structure information acquired from the media capsule provision server 102 (step S508). In this case, the my storage server 104 may cache the media capsule structure information acquired from the media capsule provision server 102 in the media capsule data cache database 306. After that, if the my storage server 104 receives an acquisition request for the data of the above-mentioned media capsule from the client terminal 106, caching the data allows providing the data to the client terminal 106 without acquiring it from the media capsule provision server 102.

Figure 11B:
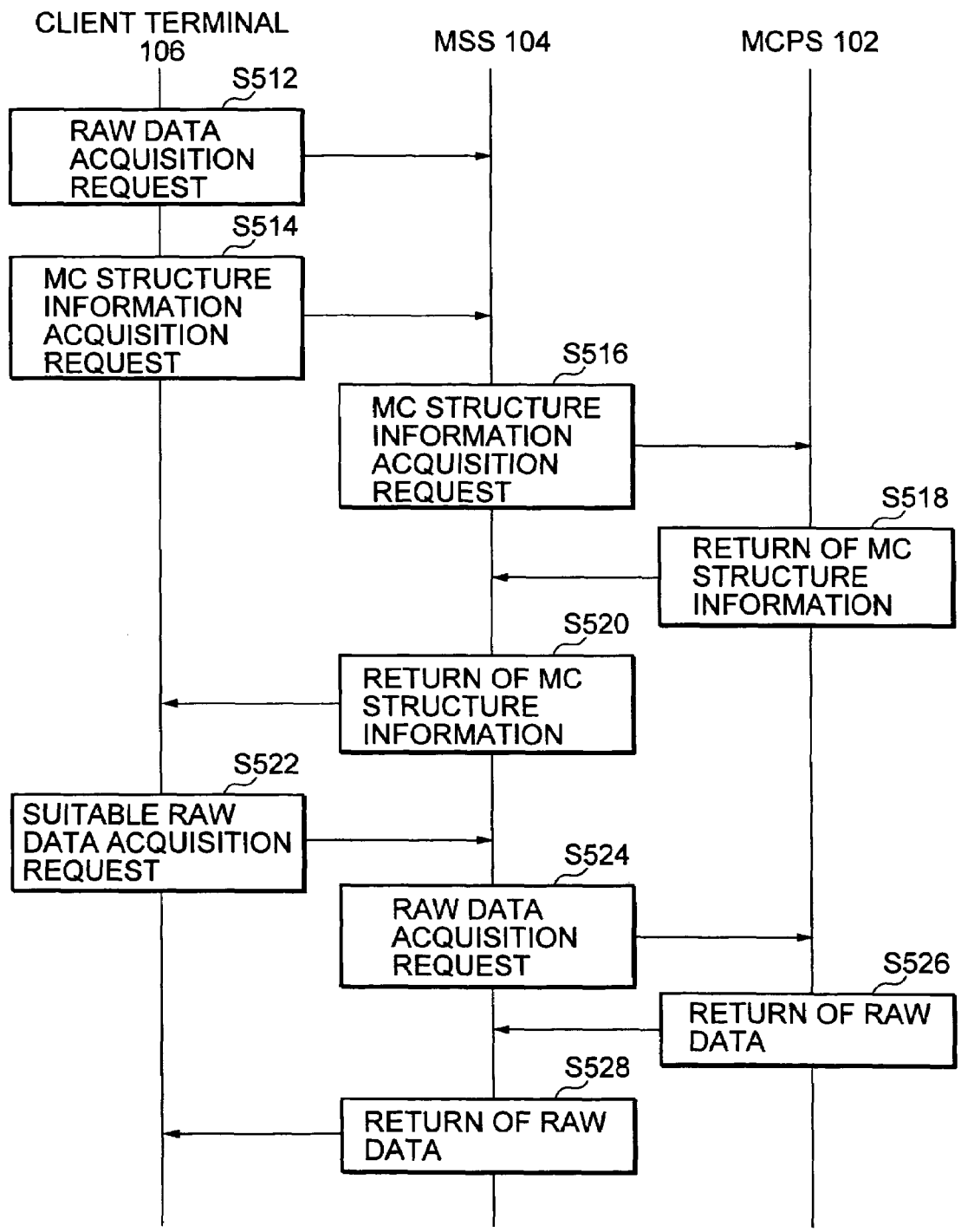
FIG. 11B is a process flow chart having shown the media capsule data acquisition process in the preferred embodiment.

Next, FIG. 11B will be described. At first, in step S512, a Raw data acquisition request occurs in the client terminal 106 (step S512). The occurrence of the Raw data acquisition request includes, in particular, for example, acquiring the Raw data of the logical contents list specified as a presentation contents list in the media capsule, or acquiring the Raw data of the logical contents list specified as the operational attribute with respect to user's operation for the media capsule.

In step 514, at first, the client terminal 106 transmits the media capsule structure information acquisition request to the my storage server 104 (step 514). When the structure information on a corresponding media capsule is not cached in the media capsule data cache database 306, the my storage server 104 transmits a media capsule structure information request to the media capsule provision server 102 in step 516. The media capsule provision server 102 transmits the media capsule structure information to the my storage server 104. The my storage server 104 caches the acquired media capsule structure information and transmits it to the client terminal 106 (step S520).

After that, based on the received media capsule structure information, the client terminal 106 chooses a suitable logical contents list, further chooses a suitable Raw data capable of being handled by the client terminal 106 from the logical contents list, and transmits an acquisition request for the suitable Raw data to the my storage server 104 (step S522). Based on the request from the client terminal 106, the my storage server 104 acquires the Raw data from the media capsule provision server 102 (steps S524, S526) and transmits it to a client terminal (step S528).

Figure 12:
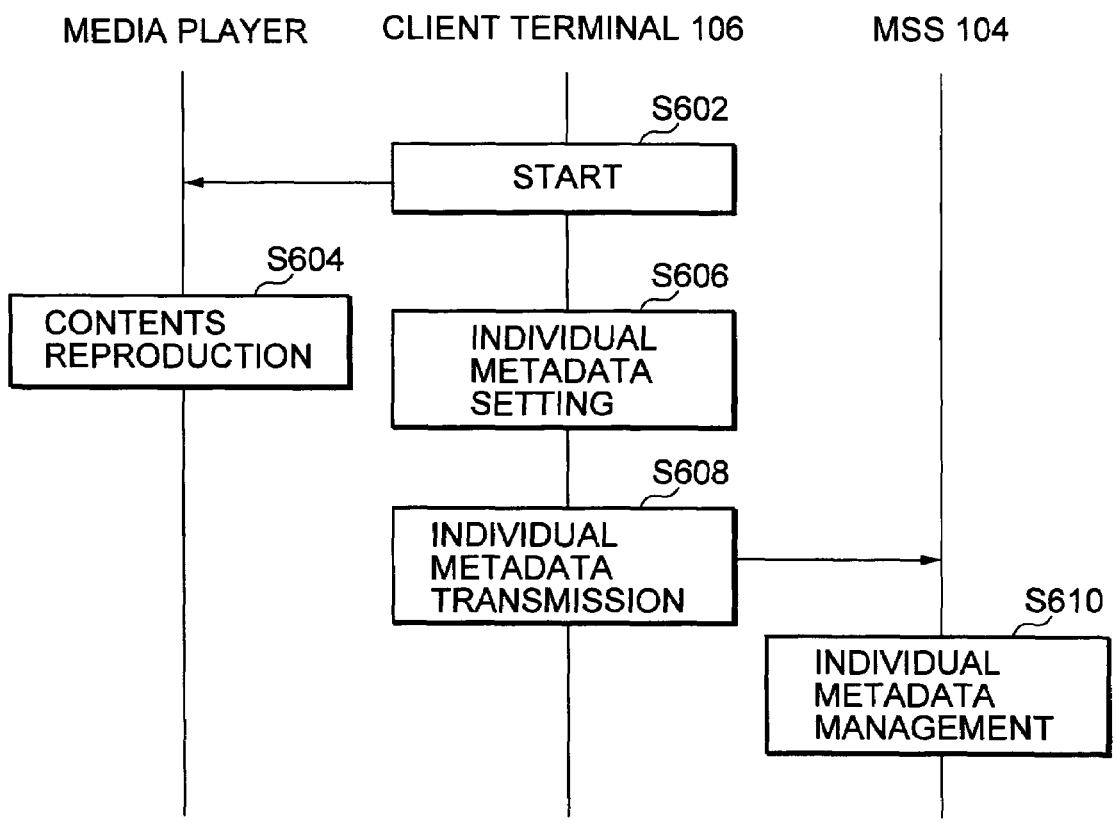
FIG. 12 is a process flow chart having shown a media capsule use processing in the preferred embodiment.

The media capsule data acquisition flow is described above. Next, a media capsule use flow will be described based on FIG. 12.

Media Capsule Use Process:

The media capsule use process means a process in which the client terminal 106 uses the media capsule acquired from the my storage server 104/the media capsule provision server 102.

Firstly in step S602, the client terminal 106 passes the Raw data acquired by using the media capsule to a reproduction application, etc. (step S602). The reproduction application may be an audio player, an image display application, etc. provided for the client terminal 106, or an information processing apparatus, other than client terminal 106, connected with the client terminal 106 so as to communicate with each other.

After that, in step S606, the client terminal 106 sets up the individual metadata (step S606). The individual metadata may be one that the client terminal 106 can automatically set up, for example, the last watched time, or may be an evaluation of the contents inputted by the user, etc. In step S608, the client terminal 106 transmits the set-up individual metadata to the my storage server 104 (step S608). The my storage server 104 stores the received individual metadata in the individual metadata database 310, and manages it (step S610).

The media capsule use flow is described above. Next, a structure of the media capsule container will be described based on FIG. 13 and FIG. 14.

Media Capsule Container:

The "media capsule container" in accordance with the preferred embodiment (also referred to as MC container in the drawings) means a container in which a plurality of media capsules are stored. Methods of creating the container include a method of creating the media capsule list in which ID's of the plurality of media capsules are listed, a method of storing an ID of the container in which it is included in each media capsule, etc. Alternatively, the media capsule container may also be regarded as one form of the media capsule, and may be constructed so that the above-mentioned media capsule list and the enclosed media capsule may be held as Raw data like the structure of a usual media capsule.

Figure 13:
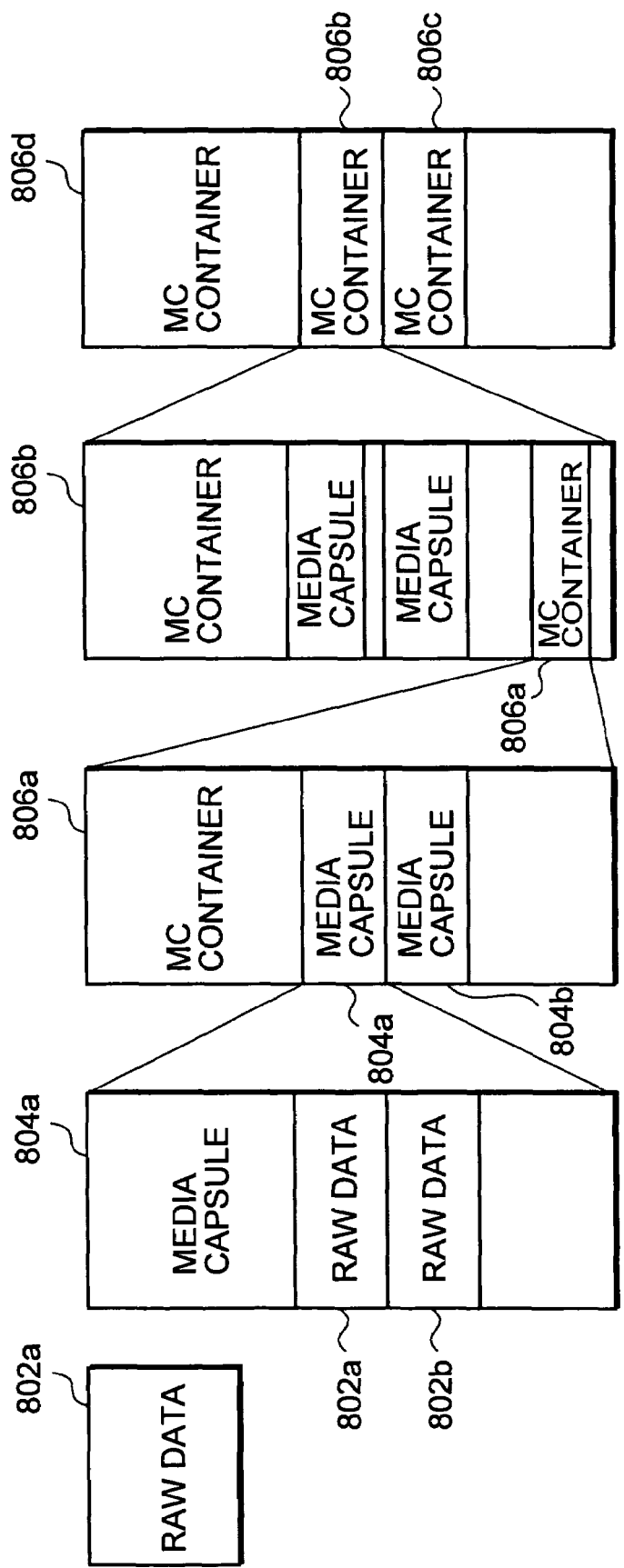
FIG. 13 is a diagram having shown a structure of a media capsule container in the preferred embodiment.

FIG. 13 is an example of a data structure of the media capsule container. As shown, a media capsule (MC) container 806*d* encloses information (ID for identifying a media capsule container, etc.) about other media capsule containers 806*b* and 806*c*. The media capsule container 806*b* enclosed in the media capsule container 806*d* further encloses information about the media capsule container 806*a*. The media capsule container 806*a* has therein information (ID for identifying the media capsule, etc.) about the media capsules 804*a* and 804*b*. The media capsule 804*a* enclosed in the media capsule container 806*a* includes information (ID for identifying the Raw data, etc.) about the Raw data 802*a* and 802*b*, or Raw data entity.

Figure 14:
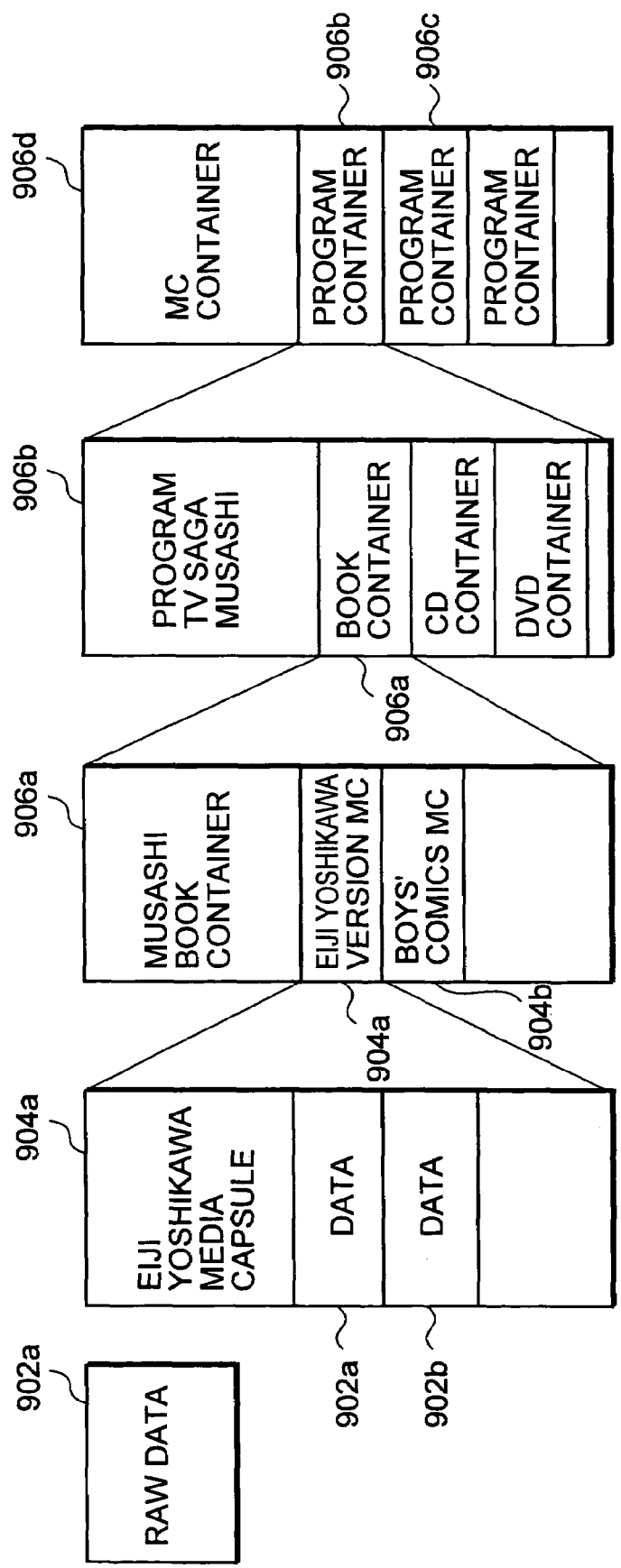
FIG. 14 is a diagram having shown an example of the media capsule container in the preferred embodiment.

FIG. 14 is an example for ease of understanding the structure of the media capsule container. The media capsule container 906*d* is constituted by TV program containers 906*b*, 906*c*, . . . , for example. The program container 906*b* contained in the media capsule container 906*d* is constituted by a book container 906*a* which encloses information on a book relating to a TV drama, saga Musashi, a CD container which similarly encloses information on a compact disk (CD) relating to the TV drama, saga Musashi, . . . , etc., for example. The Musashi book container 906*a* contained in program container 906*b* includes a media capsule 904*a* which encloses information about the book of Musashi written by an author named Eiji Yoshikawa, and a media capsule 904*b* which encloses information about a book of Musashi of a boys' comics edition, for example. The media capsule 904*a* includes a title, the content, etc. of the book as Raw data 902*a*, 902*b*.

As described above, when the media capsule container which includes the plurality of media capsules and a plurality of media capsule containers is generated, managed, and distributed in the metadata distribution management system 100 in accordance with the preferred embodiments, the user can acquire various related information data by possessing one media capsule container.

The structure of the media capsule container is described above. Next, a media capsule container development flow will be described based on FIG. 15.

Media Capsule Container Development Process:

The media capsule container development process means a process in which, having stored therein the plurality of media capsules, the media capsule container is distributed within the metadata distribution management system 100 in accordance with the preferred embodiment, so that the client terminal 106 acquires the data of the media capsule enclosed in the media capsule container provided for the user. In addition, hereafter the media capsule container will be regarded as an example of the media capsule, and described.

Firstly, in step S402, the client terminal 106 receives an action with respect to the media capsule container (step S402). The action with respect to the media capsule container means a process in which, for example, the user chooses the media capsule container displayed on the display means by the input means of the client terminal 106.

Next, in step S406, the client terminal 106 transmits the media capsule structure information request to the my storage server 104 (step S406). In the description, the media capsule container is regarded as an example of the media capsule, so that the media capsule container includes the media capsule structure information enclosed in the usual media capsule.

When the requested media capsule structure information does not exist in the media capsule data cache database 306, the my storage server 104 transmits the acquisition request to the media capsule provision server 102 in step S408. The media capsule provision server 102 transmits the media capsule structure information to the my storage server 104 in step S410. After caching the acquired media capsule structure information, the my storage server 104 transmits it to the client terminal 106 (step S412).

Based on the acquired media capsule structure information, the client terminal 106 chooses the suitable logical contents list, acquires information (ID of the Raw data indicating the media capsule list, etc.) about a media capsule list Raw data, from the logical contents list, and transmits the Raw data acquisition request to the my storage server 104 (step S414). The my storage server 410 transfers the Raw data acquisition request to the media capsule provision server 102 (step S412), and transmits the media capsule list Raw data received from the media capsule provision server 102 to the client terminal 106 (steps S418, S420).

After that, the client terminal 106 analyzes the acquired media capsule list Raw data, then in step S422, it transmits the acquisition request of metadata enclosed in the media capsule contained in the media capsule list to the my storage server 104 (step S422). The my storage server 104 acquires the media capsule structure information on the media capsule requested by the client terminal 106, from the media capsule provision server 102 (steps S424, S426), chooses the metadata requested by the client terminal 106 out of the acquired structure information, and transmits the above-mentioned metadata to the client terminal 106 (step S428). By way of the above process, the client terminal 106 can acquire the metadata contained in the media capsule enclosed in the media capsule container (step S430).

The media capsule container development flow is described above. Next, a media capsule container display flow will be described based on FIG. 16A and FIG. 16B.

Figure 15:
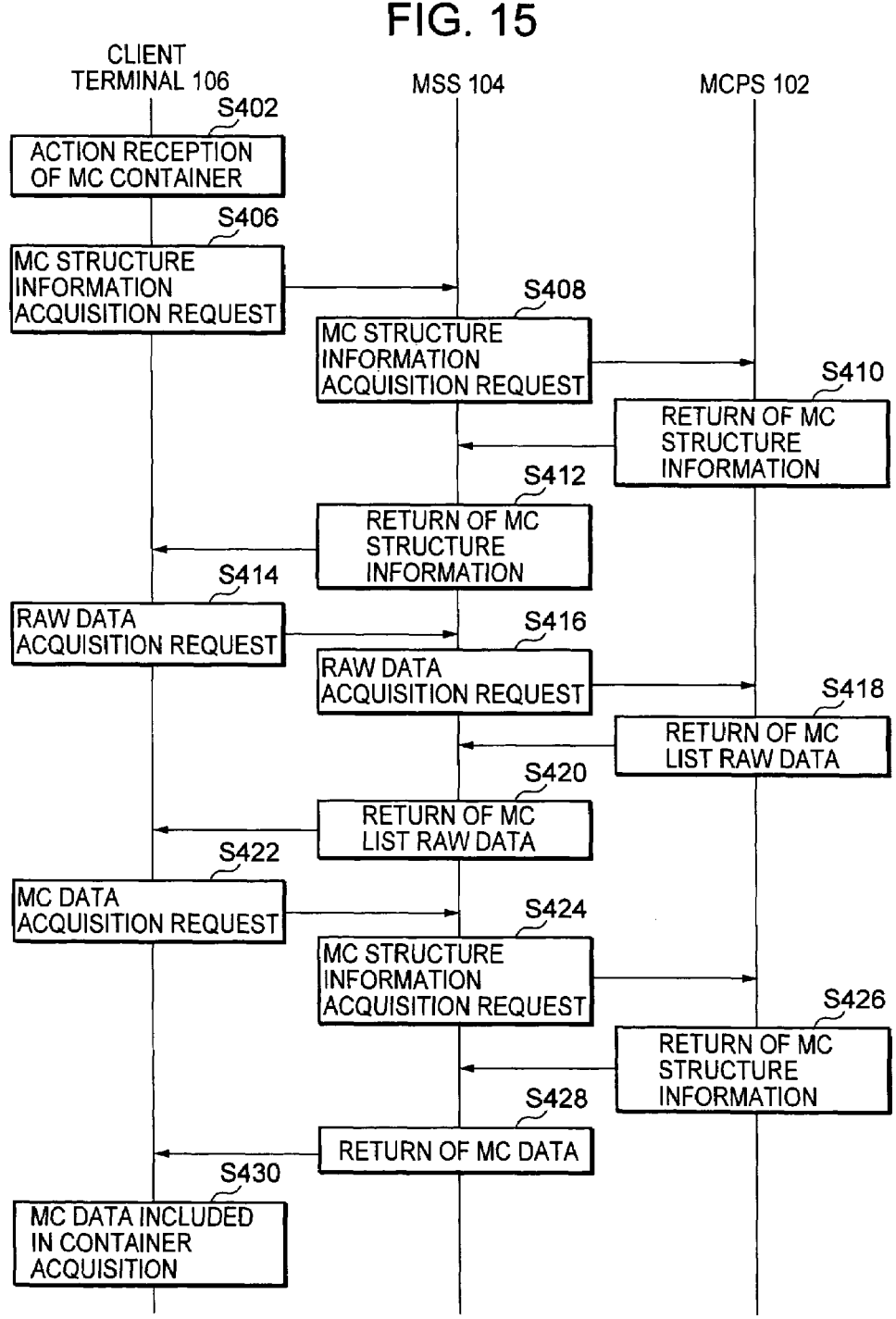
FIG. 15 is a process flow chart having shown a media capsule container development process in the preferred embodiment.
Figure 17:
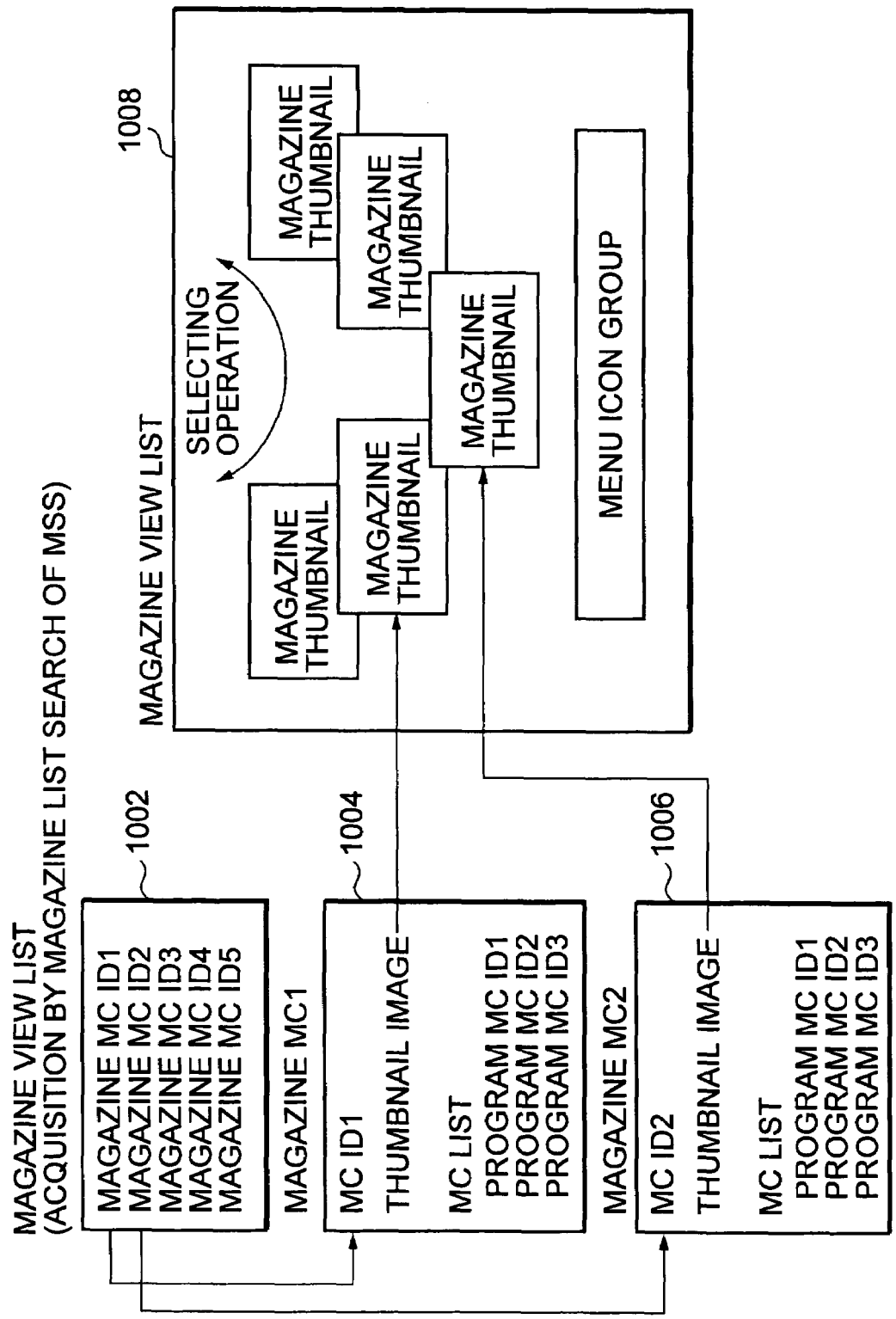
FIG. 17 is a diagram showing an example of media capsule container use in the preferred embodiment.

Media Capsule Container Display Process:

The media capsule container display process means a process of displaying, at the client terminal 106, the Raw data which are the contents shown by the media capsule within the media capsule container, based on the metadata of the media capsule within the media capsule container acquired as a result of the media capsule container development process as described in FIG. 15.

Firstly, in steps from S702 to S720 of FIG. 16A, the client terminal 106 acquires the metadata contained in the media capsule enclosed in the media capsule container. In addition, the processes in steps from S702 to S720 are almost the same as those described in connection with S402-S430 in FIG. 15, and the description will not be repeated.

Next, in S722 of FIG. 16B, the client terminal 106 transmits, to the my storage server 104, the acquisition request of the Raw data which are the contents shown by the media capsule enclosed in the media capsule container (step S722). In particular, for example, the request is issued by specifying information (such as an ID for identifying the Raw data which is desired to be acquired), and information (such as an ID for identifying the media capsule indicating the above-mentioned Raw data).

The my storage server 104 has already cached the media capsule structure information on the specified media capsule in the media capsule data cache database 306 in step S716, and therefore checks whether the requested Raw data is cached (step S726), referring to the above-mentioned structure information (step S724). If the caching is not carried out, the Raw data are acquired from the media capsule provision server 102 (steps S728, S730) and cached (S732). When a plurality of Raw data are requested, a media capsule provision server 730 places an ID of the requested Raw data and location information data on the Raw data entity or the Raw data on a list to be transmitted to the my storage server 104.

After that, the client terminal 106 acquires the above-mentioned list from the my storage server 104 (steps S734, S736), and displays it on the display means (step S738).

The media capsule container display process is described above. Next, based on FIG. 18 through FIG. 21 an example of use of the media capsule container in the metadata distribution management system 100 in accordance with the preferred embodiment will be described.

Figure 18:
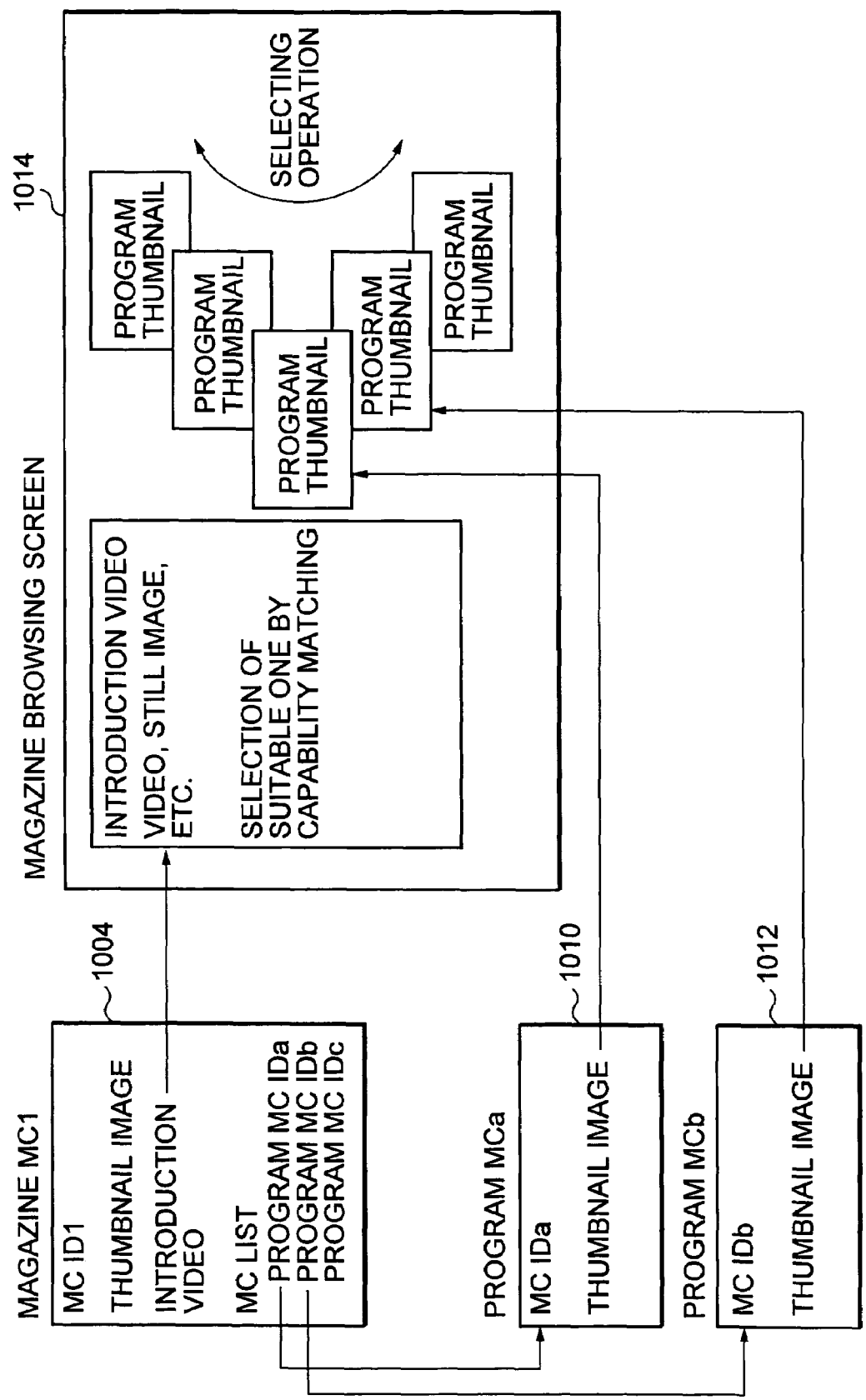
FIG. 18 is a diagram showing an example of the media capsule container use in the preferred embodiment.

FIG. 18 through FIG. 20 show an example of a screen displayed on the display means of the client terminal 106. The description will be performed by applying the media capsule container in accordance with the preferred embodiment to the magazine container in which a plurality of the media capsules packaging information on a magazine are enclosed.

A magazine list screen 1008 of FIG. 18 is a screen displayed on a display which is an example of the display means of the client terminal 106. A plurality of magazine thumbnails are displayed. Respective thumbnail images are respectively linked with the metadata contained in the magazine media capsules 1004 and 1006. The magazine media capsules 1004 and 1006 are enclosed in the magazine container 1002.

When the user clicks and chooses one magazine thumbnail on the magazine list screen 1008, a magazine browsing screen 1014 of FIG. 19 is displayed. An introduction image, etc. displayed on the magazine browsing screen 1014 are linked with the metadata enclosed in the magazine media capsule 1004. Further, as shown, the magazine media capsule 1004 is also the media capsule container having therein a plurality of program media capsules. Program thumbnails on the magazine browsing screen 1014 are respectively linked with the metadata in a program MC a1010 and a program MC b102.

When the user clicks and chooses one program thumbnail on the magazine browsing screen 1014, a program browsing screen 1022 of FIG. 20 is displayed. A title, the image, etc. displayed on the program browsing screen 1022 are linked with the data in a program MC 1020

When the user clicks and chooses a purchase button on the program browsing screen 1022, a contents list screen 1038 is displayed. An address of the content entity is stored in a logical contents list 2 within the program MC 1020. The client terminal downloads the contents with reference to the above-mentioned address. The purchased contents are downloaded. The purchased contents are reproduced with a media player 1040, etc., so that the user can view and listen to the above-mentioned contents.

Although the preferred embodiments in accordance with the present invention are described above with reference to the accompanying drawings, the present invention is not limited to the preferred embodiments naturally. It will be apparent to one skilled in the art that variations and modifications are contemplated within the scope of claims. It is to be naturally understood that these are within the technical scope of the invention.

The present invention is applicable to a metadata distribution management system. In particular, it is applicable to a metadata distribution management system where, in order for a user to acquire and use a digital content over a communications network, a plurality of metadata relating to the above-mentioned digital content are packaged and provided for the user, so as to distribute the packaged metadata.

What is claimed is:

1. A metadata distribution management system being configured to include at least one metadata distribution management apparatus for managing a metadata relating to a digital content, and at least one client terminal connectable to the metadata distribution management apparatus through a communications network, wherein;

said metadata distribution management apparatus comprises;

metadata memory means for storing two or more metadata relating to the digital contents which includes at least a location information data on the digital contents, and a type information data on the digital contents;

metadata package creation means for creating a metadata package by combining at least two or more of the metadata stored in the metadata memory means;

container generation means for generating a container including the metadata package created by the metadata package creation means, the container including identification links to containers having related contents, a list of metadata that is located in the container, and a presentation image metadata list, the presentation image metadata list having a plurality of representative images for visually representing the digital content referenced with the metadata included in the container;

metadata package distribution means for distributing the container to the client terminal through the communications network;

metadata package destination information storage means for storing destination information data linking an information data identifying a user who uses the client terminal to which the container is distributed, and an information data identifying the metadata package;

a recommendation search process means for generating a search result by searching a search database including the type information data on the digital content, based on an individual profile of the user including a profile vector, and for sending the search result to the client terminal; and a verification means for checking if the digital content referenced by the location information data is present in a content cache memory, and in case the digital content is not present, the digital content is acquired from a content provision server and stored in the content cache memory, and said client terminal comprises;

metadata package acquisition means for acquiring the container from the metadata distribution management apparatus through the communications network;

metadata package operation processing means for acquiring the digital content with reference to the location information data included in the metadata package of the container, and performing a process suitable for the type of the digital content with reference to the type information data; and a screen display means for extracting and displaying the plurality of representative images included in the container of the metadata package, and establishing a user-selectable link from each displayed representative image to digital content that is represented by the plurality of representative images based on the location information data.

2. The metadata distribution management system as cited in claim 1, further comprising:

an individual metadata management apparatus connectable to the client terminal and the metadata distribution management apparatus through the communications network, wherein said individual metadata management apparatus comprises:

metadata package acquisition means for acquiring the container from the metadata distribution management apparatus through the communications network;

metadata package memory means for storing the container;

transmission means for transmitting one or more metadata included in the container to the client terminal; and a profile extraction means for generating the individual profile of the user including the profile vector based on information identifying the user and common features of the one or more metadata associated to the user and sending the individual profile to the metadata distribution management apparatus, wherein an information data identifying the metadata package of the container stored in the metadata package memory means and the information data identifying the user who uses the client terminal being transmitted the metadata package are linked and managed.

3. The metadata distribution management system as cited in claim 1, wherein the container generation means includes a different metadata package for every user in the container, based on the destination information data stored in the metadata package destination information storage means.

4. A metadata distribution management apparatus for managing a metadata relating to a digital content comprising:

metadata memory means for storing two or more metadata relating to the digital content including at least the location information data on the digital content and the type information data on the digital content;

metadata package creation means for creating a metadata package by combining at least two or more of the metadata stored in the metadata memory means;

container generation means for generating a container including the metadata package created by the metadata package creation means, the container including identification links to containers having related contents, a list of metadata that is located in the container, and a presentation image metadata list, the presentation image metadata list having a plurality of representative images for visually representing the digital content referenced with each metadata included in the container;

metadata package distribution means for distributing the container to a connectable client terminal through a communications network;

metadata package destination information storage means for storing destination information data linking an information data identifying a user who uses the client terminal to which the container is distributed, and an information data identifying the container;

a recommendation search process means for generating a search result by searching a search database including the type information data on the digital content, based on an individual profile of the user including a profile vector, and for sending the search result to the connectable client terminal; and a verification means for checking if the digital content referenced by the location information data is present in a content cache memory, and in case the digital content is not present, the digital content is acquired from a content provision server and stored in the content cache memory.

5. The metadata distribution management system according to claim 1, wherein the screen display means is configured to display a program browsing screen upon a user clicking on one of the plurality of representative images.

6. The metadata distribution management apparatus as cited in claim 4, wherein
the container generation means includes a different metadata package for every user in the container, based on the destination information data stored in the metadata package destination information storage means.

7. An individual metadata management apparatus for managing metadata relating to a digital content for each user that accesses a digital content by using the metadata, said individual metadata management apparatus comprising:

metadata package acquisition means for acquiring a container including the metadata package through a communications network from a connectable metadata distribution management apparatus through the communications network the connectable metadata distribution management apparatus including metadata memory means for storing two or more metadata relating to the digital contents which includes at least a location information data on the digital contents, and a type information data on the digital contents, metadata package creation means for creating a metadata package by combining at least two or more of the metadata stored in the metadata memory means, container generation means for generating a container including the metadata package created by the metadata package creation means, the container including identification links to containers having related contents, a list of metadata that is located in the container, and a presentation image metadata list, the presentation image metadata list having a plurality of representative images for visually representing the digital content referenced with the metadata included in the container, metadata package distribution means for distributing the container to the client terminal through the communications network, metadata package destination information storage means for storing destination information data linking an information data identifying a user who uses the client terminal to which the container is distributed, and an information data identifying the metadata package, a recommendation search process means for generating a search result by searching a search database including the type information data on the digital content, based on an individual profile of the user including a profile vector, and for sending the search result to the client terminal, and a verification means for checking if the digital content referenced by the location information data is present in a content cache memory, and in case the digital content is not present, the digital content is acquired from a content provision server and stored in the content cache memory;

metadata package memory means for storing the container;

transmission means for transmitting one or more metadata included in the container to a connectable client terminal through the communications network;

a profile extraction means for generating the individual profile of the user including the profile vector based on information identifying the user and on common features of the one or more metadata associated to the user, and sending the individual profile to the connectable metadata distribution management apparatus; and a screen display means for extracting and displaying the plurality of representative images included in the container of the metadata package, and establishing a user-selectable link from each displayed representative image to the digital content that is represented by the plurality of representative images based on the location information data, wherein the information data identifying the metadata package of the container is stored in the metadata package memory means and the information data identifying the user who uses the client terminal to which the metadata package is transmitted are linked and managed.

8. A client terminal configured to connect to at least one of a metadata distribution management apparatus and an individual metadata management apparatus through a communications network, the metadata distribution management apparatus including metadata memory means for storing two or more metadata relating to the digital contents which includes at least a location information data on the digital contents, and a type information data on the digital contents, metadata package creation means for creating a metadata package by combining at least two or more of the metadata stored in the metadata memory means, container generation means for generating a container including the metadata package created by the metadata package creation means, the container including identification links to containers having related contents, a list of metadata that is located in the container, and a presentation image metadata list, the presentation image metadata list having a plurality of representative images for visually representing the digital content referenced with the metadata included in the container, metadata package distribution means for distributing the container to the client terminal through the communications network, metadata package destination information storage means for storing destination information data linking an information data identifying a user who uses the client terminal to which the container is distributed, and an information data identifying the metadata package, a recommendation search process means for generating a search result by searching a search database including the type information data on the digital content, based on an individual profile of the user including a profile vector, and for sending the search result to the client terminal, and a verification means for checking if the digital content referenced by the location information data is present in a content cache memory, and in case the digital content is not present, the digital content is acquired from a content provision server and stored in the content cache memory, said client terminal comprising:

metadata package acquisition means for acquiring the metadata package from the distribution management apparatus and/or the individual metadata management apparatus through the communications network, the metadata package included in the container;

metadata package operation processing means for acquiring the digital content with reference to the location information data of the digital content included in the container of the metadata package, and performing a process suitable for the type of the digital content with reference to the type information data of the digital content;

a screen display means for extracting and displaying the plurality of representative images included in the container of the metadata package, and establishing a user-selectable link from each displayed representative image to the digital content that is represented by the plurality of representative images based on the location information data; and a unit for receiving a search result based on the individual profile of the user including the profile vector.

9. A metadata distribution management method implemented by using at least one metadata distribution management apparatus for managing metadata relating to a digital content, and at least one client terminal connectable to the metadata distribution management apparatus through a communications network, said metadata distribution management method comprising:

storing two or more metadata relating to the digital content which the metadata distribution management apparatus includes at least a location information data on the digital content and a type information data on the digital content;

creating a metadata package by combining at least two or more of the stored metadata;

generating a container including the metadata package created by said step of creating, the container including identification links to containers having related contents, a list of metadata that is located in the container, and a presentation image metadata list, the presentation image metadata list having a plurality of representative images for visually representing the digital content referenced with the metadata included in the container;

distributing the container to the client terminal through the communications network;

storing a destination information data linking an information data identifying a user who uses the client terminal to which the container is distributed and an information data identifying the metadata package;

acquiring by the client terminal the container from the metadata distribution management apparatus through the communications network;

performing a process suitable for the type of the digital content with reference to the type information data, acquiring the digital content with reference to the location information data included in the container;

searching a search database including the type information data on the digital contents, based on an individual profile of the user including a profile vector to generate a search result including user preference;

sending the search result to the client terminal;

checking if the digital content referenced by the location information data is present in a content cache memory, and in case the digital content is not present, the digital content is acquired from a content provision server and stored in the content cache memory;

extracting and displaying the plurality of representative images included in the container of the metadata package; and establishing a user-selectable link from each displayed representative image to digital content that is represented by the plurality of representative images based on the location information data.

10. The metadata distribution management method as cited in claim 9, wherein an individual metadata management apparatus is connected to the client terminal and the metadata distribution management apparatus through the communications network, the method further comprising:

acquiring the container from the metadata distribution management apparatus at the individual metadata management apparatus through the communications network;

storing the container at the individual metadata management apparatus;

transmitting one or more metadata included in the container from the individual metadata management apparatus to the client terminal;

managing an information data identifying the stored metadata package of the container and an information data identifying a user at the individual metadata management apparatus, the user using the client terminal being transmitted the metadata package by linking to each other; and generating the individual profile of the user including the profile vector based on information identifying the user and common features of the one or more metadata associated to the user; and sending the individual profile to the metadata distribution management apparatus.

11. The metadata distribution management method as cited in claim 9, further comprising:

generating a different metadata package for every user in the container at the metadata distribution management apparatus, based on the destination information data; and distributing the container from the metadata distribution management apparatus to the client terminal through the communications network.

12. A metadata distribution management device configured to manage metadata relating to a digital content comprising:

metadata memory configured to store two or more metadata relating to the digital content including at least the location information data on the digital content and the type information data on the digital content;

a metadata package creator configured to create a metadata package by combining at least two or more of the metadata stored in the metadata memory;

container generator configured to generate a container including the metadata package created by the metadata package creator, the container including identification links to containers having related contents, a list of metadata that is located in the container, and a presentation image metadata list, the presentation image metadata list having a representative image for each metadata included in the container;

a metadata package distributor configured to distribute the container to a connectable client terminal through a communications network;

a metadata package destination information memory configured to store destination information data linking an information data identifying a user who uses the client terminal to which the container is distributed, and an information data identifying the metadata package;

a recommendation search processor configured to generate a search result by searching a search database including the type information data on the digital content, based on an individual profile of the user including a profile vector, and configured to send the search result to the connectable client terminal; and a verification unit configured to check if the digital content referenced by the location information data is present in a content cache memory, and in case the digital content is not present, the digital content is acquired from a content provision server and stored in the content cache memory.

13. The metadata distribution management device as cited in claim 12, wherein the container generator includes a different metadata package for every user in the container, based on the destination information data stored in the metadata package destination information memory.

14. An individual metadata management device configured to manage metadata relating to a digital content for each user that accesses a digital content by using the metadata, said individual metadata management device comprising:

a metadata package acquirer configured to acquire a container including the metadata package through a communications network from a connectable metadata distribution management apparatus through the communications network, the container further including identification links to containers having related contents, a list of metadata that is located in the container, and a presentation image metadata list, the presentation image metadata list having a plurality of representative images for visually representing the digital content referenced with the metadata included in the container;

metadata package memory configured to store the container and location information data on the digital content;

a transmitter configured to transmit one or more metadata included in the metadata package of the container to a connectable client terminal through the communications network;

a profile extractor configured to generate an individual profile of an user including a profile vector based on information identifying the user and on common features of the one or more metadata associated to the user, and sending the individual profile to the connectable metadata distribution management apparatus; and a verification unit configured to check if the digital content referenced by the location information data is present in a content cache memory, and in case the digital content is not present, the digital content is acquired from a content provision server and stored in the content cache memory, wherein an information data identifying the metadata package of the container stored in the metadata package memory and an information data identifying a user who uses the client terminal to which the container is transmitted are linked and managed.

15. The individual metadata management apparatus according to claim 7, wherein the screen display means is configured to display a program browsing screen upon a user clicking on one of the plurality of representative images.

16. The client terminal according to claim 8, wherein the screen display means is configured to display a program browsing screen upon a user clicking on one of the plurality of representative images.

17. The metadata distribution management method according to claim 9, further comprising the step of:

displaying a program browsing screen upon a user clicking on one of the plurality of representative images.

* * * * *